United States Patent [19]
Wakiyama et al.

[11] Patent Number: 5,806,069
[45] Date of Patent: Sep. 8, 1998

[54] METHOD AND SYSTEM OF MANAGING CONSTRUCTION-RELATED INFORMATION AND PRODUCTION-RELATED INFORMATION

[75] Inventors: Harumichi Wakiyama, Toyota; Tadashi Naito, Nagoya; Masato Ohtomo; Tomohisa Kumagai, both of Toyota, all of Japan

[73] Assignee: Toyota Jidosha Kabushiki Kaisha, Toyota, Japan

[21] Appl. No.: 786,339

[22] Filed: Jan. 23, 1997

[30] Foreign Application Priority Data

Jan. 29, 1996 [JP] Japan .................................. 8-012677
Jan. 20, 1997 [JP] Japan .................................. 9-007553

[51] Int. Cl.⁶ ............................................. G06F 17/30
[52] U.S. Cl. .................. 707/102; 707/10; 364/468.03
[58] Field of Search ................ 707/102, 10; 364/468.03

[56] References Cited

U.S. PATENT DOCUMENTS

| | | | |
|---|---|---|---|
| 4,964,060 | 10/1990 | Hartsog | 364/512 |
| 5,191,534 | 3/1993 | Orr et al. | 364/468.12 |
| 5,260,883 | 11/1993 | Wilson | 364/512 |
| 5,295,242 | 3/1994 | Mashruwala et al. | 345/356 |
| 5,355,317 | 10/1994 | Talbott et al. | 364/468.03 |
| 5,526,257 | 6/1996 | Lerner | 364/401 |
| 5,652,880 | 7/1997 | Seagraves | 707/103 |
| 5,710,700 | 1/1998 | Kurtzberg et al. | 364/149 |
| 5,717,598 | 2/1998 | Miyakawa et al. | 364/468.09 |
| 5,727,175 | 3/1998 | Malone et al. | 345/356 |
| 5,740,425 | 4/1998 | Povilus | 707/100 |

FOREIGN PATENT DOCUMENTS

| | | |
|---|---|---|
| B1-0448044 | 9/1991 | European Pat. Off. . |
| A-5-89193 | 4/1993 | Japan . |
| A-6-83693 | 3/1994 | Japan . |
| A-07-114601 | 5/1995 | Japan . |
| A-7-114464 | 5/1995 | Japan . |
| A-07-178654 | 7/1995 | Japan . |

OTHER PUBLICATIONS

K. Uota and T. Koikari, "Data Base", Feb. 3, 1995, second printing, Nikkagiren Publishing Company, Tokyo, Japan.

*Nikkei Mechanical*, Feb. 20, 1995, pp. 20–36, Nikkei Business Publications, Inc., Tokyo, Japan.

*Primary Examiner*—Wayne Amsbury
*Attorney, Agent, or Firm*—Oliff & Berridge

[57] ABSTRACT

Method and apparatus for totally managing sets of construction-related information relating to constructional relationship between each product to be produced and its component parts, and sets of production-related information relating to production of the products, wherein the sets of construction- and production-related information are determined as respective subjects which can be similarly processed and which are classified into classes on the basis of extracted mutual relationships of the subjects, and a set of subject data incorporating mutually related sets of element data including subject substance data and relationship substance data which indicate substances of each subject and the relationships is stored by a data storing device operated by a user, in a production information memory from which the set of subject data is retrieved and outputted by an output device.

10 Claims, 34 Drawing Sheets

RELATIONSHIP BETWEEN PART AND PROCESS

```
┌─────────────────────────────────────────┐
│  ▭       SEARCH RESULT         ▲ │ ▼    │
│       ┌─────────┐    ┌─────────┐        │
│       │ DISPLAY │    │   END   │        │
│       └─────────┘    └─────────┘        │
│─────────────────────────────────────────│
│                                         │
│                 ┌──────────┐            │
│        PROCESS  │  MANUAL  │            │
│                 │ASSEMBLING│            │
│                 └──────────┘            │
│         ┌────────┬───────┬───────┐      │
│         │PROCESS │DATA I │DATA II│      │
│         │ NAME   │       │       │      │
│         ├────────┼───────┼───────┤▨     │
│         │   AB   │  1-a  │  1-b  │      │
│         ├────────┼───────┼───────┤      │
│         │  ABC   │  2-a  │  2-b  │      │
│         ├────────┼───────┼───────┤      │
│         │  ABD   │  3-a  │  3-b  │      │
│         └────────┴───────┴───────┘      │
│                                         │
└─────────────────────────────────────────┘
```

FIG.22

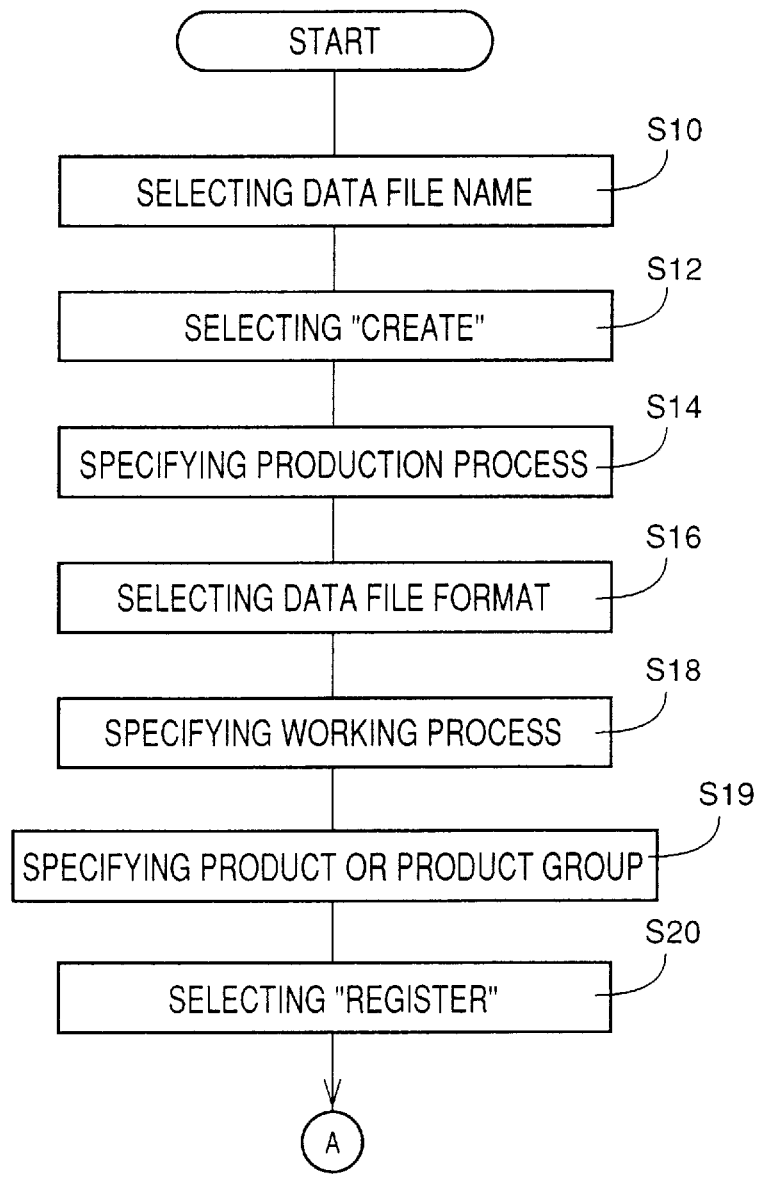

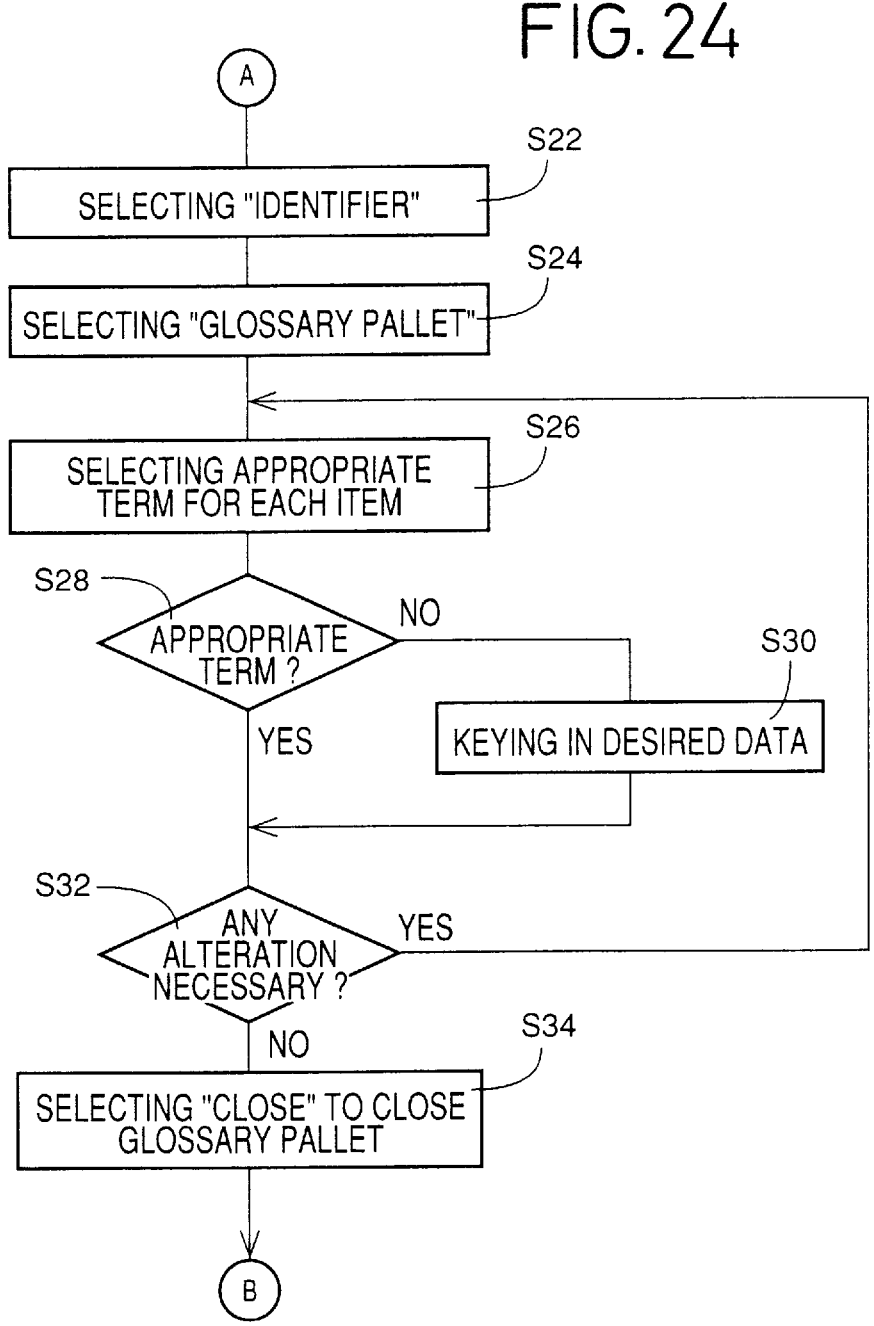

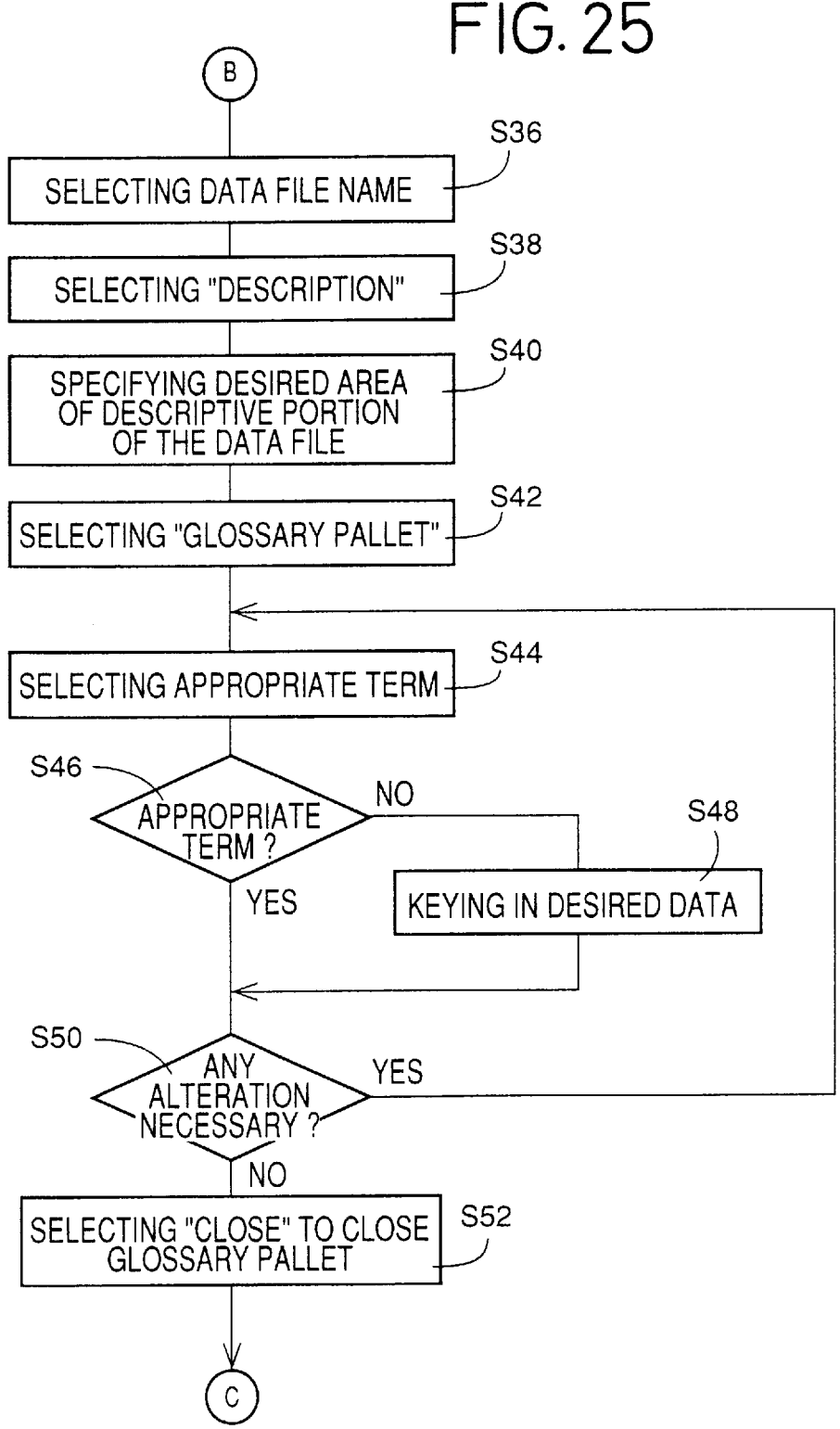

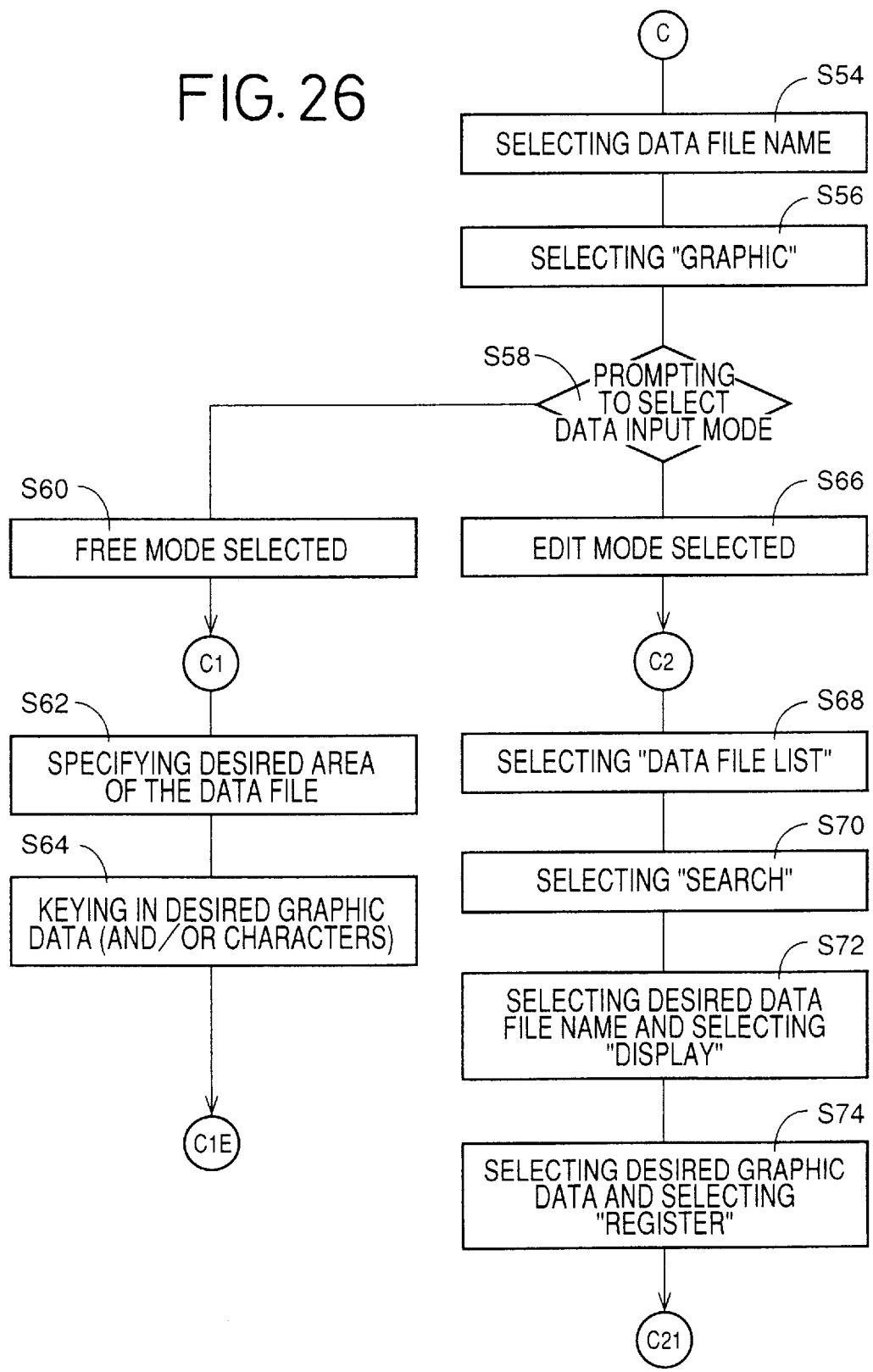

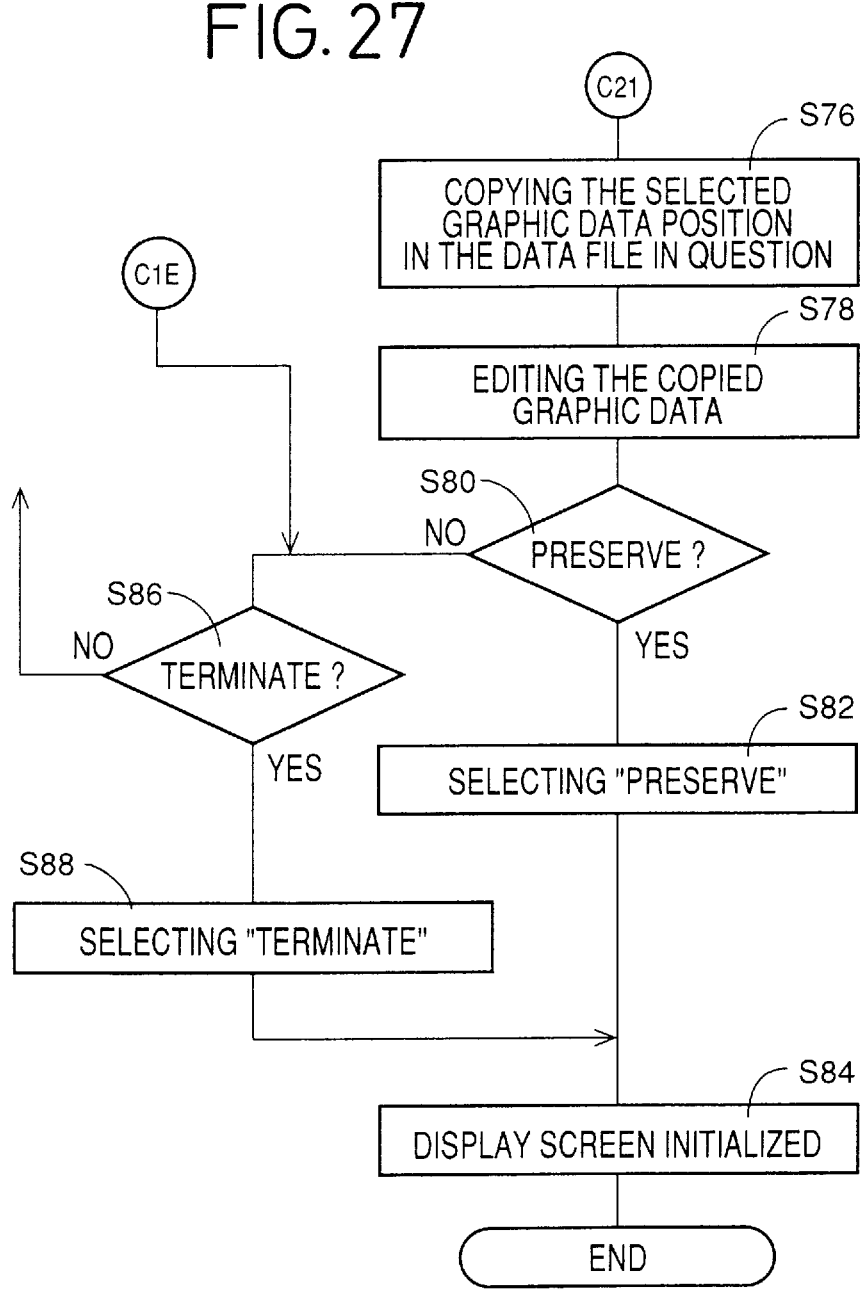

| PRODUCTION PROCESS α | | | | PRODUCT A1 | | | |
|---|---|---|---|---|---|---|---|
| No. | PARTS | DRAWING | APPROVED | No. | PARTS | DRAWING | APPROVED |
| 1 | a | ⬡ | | 5 | e | ☆ | |
| 2 | b | ⬡ | | 6 | f | ◇ | |
| 3 | c | ⬡ | | 7 | g | ∞ | |
| 4 | d | △ | | 8 | h | ♣ | |

FIG.34

METHOD AND SYSTEM OF MANAGING CONSTRUCTION-RELATED INFORMATION AND PRODUCTION-RELATED INFORMATION

This application is based on Japanese Patent Application No. 8-12677 filed Jan. 29, 1996 and No. 9-7553 filed Jan. 20, 1997, the contents of which are incorporated herein by reference.

CROSS REFERENCE TO RELATED APPLICATIONS

Not Applicable

BACKGROUND OF THE INVENTION

1. Field of the Invention

The present invention relates in general to techniques for managing information on products in the manufacture of the products, and more particularly to techniques for totally managing different sets of product information with improved efficiency.

2. Discussion of the Prior Art

Generally, a product is a combination or aggregation of a plurality of parts or components. Therefore, information relating to the constructional relationship between the product and the parts (hereinafter referred to as "construction-related information") is required to manufacture the product. Further, the manufacture of the product requires production-related information relating to the production of the product and the component parts.

Conventionally, such construction-related information and production-related information are managed or treated as different kinds of information, independently of each other. Usually, the construction-related information primarily relates to tangibles (i.e., products and parts), while the production-related information primarily relates to intangibles, namely, operations or processes to manufacture the parts and the final products. Thus, the construction-related information and the production-related information are different in nature, and are generally prepared and handled by different departments and engineers or workers in a manufacturer. Conventionally, therefore, data bases for the construction-related information are prepared and managed independently of data bases for the production-related information.

In the prior art indicated above, for example, a design department of a manufacturer obtains a relationship between the construction-related information and the production-related information, and supplies a production department with production data necessary to manufacture the products, which production data should be easily understandable to the production department. This task of the design department is a considerable work load, and tends to suffer from errors in communication between the design and production departments.

SUMMARY OF THE INVENTION

The present invention was developed to solve at least a part of the prior art problem discussed above. Namely, it is therefore a first object of the present invention to provide a method of totally managing construction-related information and production-related information with improved efficiency.

A second object is to provide a system suitable for practicing the above method.

The first object may be achieved according to a first aspect of this invention, which provides a method of totally managing a plurality of sets of construction-related information and a plurality of sets of production-related information, each of the plurality of sets of construction-related information relating a constructional relationship between a corresponding one of a plurality of products to be produced and a plurality of parts which constitute each product, while the plurality of sets of production-related information relating production of the products, respectively, the method comprising the steps of: (a) determining each of the plurality of sets of construction-related information and the plurality of sets of production-related information as a corresponding one of a plurality of subjects which can be similarly processed; (b) extracting at least one relationship of each of the plurality of subjects with the other of the subjects; (c) classifying the plurality of subjects into a plurality of classes on the basis of the extracted at least one relationship of the each subject; (d) generating subject substance data indicative of a substance of each subject and relationship substance data indicative of a substance of each extracted relationship of each subject; (e) storing, for each subject, a set of subject data incorporating a plurality of sets of element data in relation to each other, in a product information memory, the plurality of element data including the subject substance data and the relationship substance data of the each subject; and (f) retrieving the set of subject data for at least one of the plurality of subjects from the product information memory, and outputting the retrieved set of subject data.

In the information managing method according to the first aspect of the present invention, the sets of construction-related information and the sets of production-related information are both determined as the similar subjects which can be processed similarly, although these sets of information are different in substance from each other. Namely, the construction-related information relates to the tangible products and their component parts, while on the other hand the production-related information relates to the intangible processes of production of the products. The subjects are classified into two or more classes on the basis of the extracted relationship or relationships of each subject with the other subjects, and the subject substance data indicative of the substance of each subject and the relationship substance data indicative of the substance of each relationship are generated. For each subject, a set of subject data incorporating two or more sets of element data including the subject substance data and the relationship substance data of each subject is stored in the product information memory, in a relation to each other. The subject data for each desired subject is retrieved from the product information data and outputted or reproduced. For example, the subject data for one desired subject are retrieved from the product information data, and the subject data for the other subject or subjects associated with the above-indicated one subject are also retrieved according to the relationship substance data of the subject data for the above-indicated one subject. Thus, the sets of subject data of the mutually associated subjects are read out from the product information memory and reproduced.

Thus, the construction-related information and the production-related information are stored in the product information memory, as the subject substance data and the relationship substance data, such that the construction-related information and the production-related information are related to each other. This arrangement eliminates cumbersome and time-consuming operations to coordinate the construction- and production-related information once these information are stored in the product information memory, to thereby assure improved efficiency of management of the product information including the construction-related information and the production-related information.

Where a subject A has some relationships with subjects B and C, only a set of subject data for the subject A is stored in the product information memory, in relation to the subjects B and C. That is, it is not necessary to store two sets of subject data for the subject A in relation to the respective two related subjects B and C. Accordingly, the required data storage capacity of the product information memory can be significantly reduced.

When it is desired to change the subject data for the subject A in the above case where the subject A has some relationships with the subjects B and C, it is not necessary to change the subject data of the subject A in relation to the related subject B on the one hand, and also in relation to the other related subject C on the other hand. Namely, the present arrangement requires only a single change of the subject data for the subject A, in relation to the subject data for both of the related subjects B and C. Thus, the information managing method according to the first aspect of this invention facilitates changes of the subject data and permits all necessary changes to be made to the stored information when the subject data of a given subject is changed.

In the present method, the subject substance data and the relationship substance data of each set of subject data for each subject are stored in the product information memory in relation to each other, and the sets of the thus mutually related subject data for the individual subjects are stored independently of each other. This arrangement does not require the product information memory to consist of a one single data storage, and permits the sets of subjects data to be stored in two or more data storage areas which constitute the product information memory. Thus, the required data storage capacity of each data storage area of the product information memory can be reduced.

The first aspect of this invention will be further explained in terms of the "production-related information", "relationship" and "output".

The "production-related information" includes: data indicating the location of production of each part of each product (or location of production of the product); data indicating the manner, condition, procedure and other elements of the production of each part; data indicating the required characteristics or properties of each part to assure the quality of the part; data indicating the suppliers of each part; data indicating the purchase prince of each part; and data indicating the selling price of each part.

The "at least one relationship" of each subject to the other subjects includes: generalization and specialization generally expressed as ". . . is a . . ." relating to high-order and low-order classes in the classification of a plurality of subjects in hierarchy; and aggregation and decomposition generally expressed as ". . . is part of . . . " relating to the high-order and low-order classes. The concepts of the "generalization", "specialization", "aggregation" and "decomposition" will be described more specifically.

The "relationship" further includes "recursion", which is a relationship wherein subjects in the same class are linked with each other.

The "output" of the subject data takes various forms, including reproducing means for permitting the subject data to be visible to the human being, such as recording media (e.g., paper sheets and films), display media (e.g., display screen), means for permitting the subject data to be audible to the human being, such as vibrating media (transmitted to the human being through the air), and means for transmitting electric signals through signal lines.

The second object indicated above may be achieved according to a second aspect of the present invention, which provides a system for totally managing a plurality of sets of construction-related information and a plurality of sets of production-related information, each of the plurality of sets of construction-related information relating a constructional relationship between a corresponding one of a plurality of products to be produced and a plurality of parts which constitutes the each product, while the plurality of sets of production-related information relating production of the products, respectively, the system comprising: (i) a product information memory for storing the plurality of sets of construction-related information and the plurality of sets of production-related information as a plurality of subjects which can be processed similarly and which are classified into a plurality of classes on the basis of extracted at least one relationship of each of the plurality of subjects with the other of the subjects; (ii) a data storing device operable to store a set of subject data incorporating a plurality of sets of element data for each of the plurality of subjects in relation to each other, in the product information memory, in response to a data storing operation by a user of the system, the plurality of sets of element data for the each subject including at least one set of subject substance data indicative of a substance of each subject and at least one set of relationship substance data indicative of a substance of each of the extracted at least one relationship of each subject; and (iii) a subject data output device for retrieving the set of subject data for at least one of the subjects from the product information memory and outputting the retrieved set of subject data, in response to an operation by the user.

In the information managing system according to the second aspect of this invention, the data storing device is operated in response to a data storing operation by the user of the system, to store the sets of construction-related information and the sets of production-related information in the product information memory, as respective subjects that can be similarly processed. More specifically described, a set of subject data incorporating sets of element data for each of the subjects is stored in the product information memory, such that the sets of element data for each subject include at least one set of subject substance data indicative of the substance of each subject and at least one set of relationship substance data indicative of the substance of each extracted relationship of each subject to the other subjects, and such that the subject substance data and the relationship substance data are related to each other. The subject data output device is operated by the user to retrieve the subject data for a desired subject from the product information memory and output or reproduce the retrieved subject data.

The information managing system according to the second aspect of this invention is suitable for practicing the method according to the first aspect of the invention. The above explanation of the "production-related information", "relationship" and "output" with respect to the first aspect of the invention is equally applicable to the second aspect of the invention.

According to one preferred form of the system according to the second aspect of the invention, the subject data output device comprises: a display medium for displaying the above-indicated at least one of the plurality of subject data; a display information memory for storing layout data and memory location data, the layout data representing a layout of the plurality of sets of element data for each subject to be displayed at respective positions on the display medium, the memory location data being representing locations of the plurality of sets of element data in the product information memory; storing means operable for storing the layout data and the memory location data in the display information memory, in response to a data storing operation by the user; and displaying means for reading out the layout data and the memory location data from the display information memory, to retrieve the above-indicated at least one of the plurality of subject data from the product information memory, on the basis of the read-out memory location data, and for displaying the at least one set of subject data on the display medium according to the layout represented by the read-out layout data.

In the above preferred form of the information managing system, the information which is stored in the product information memory and which is to be displayed on the display medium is not stored in the display information memory. Instead, the display information memory stores the layout data and the memory location data which represent the locations of the sets of element data in the product information memory. Thus, the present system does not require the element data of the subject data to be stored in the display information memory as well as in the product information memory.

Therefore, the above preferred form of the information managing system is effective to reduce the required data storage capacity of the display information memory. Further, the present system eliminates an operation to change the content of the display information memory when the subject data for a given subject in the product information memory is changed. Accordingly, the work load on the user of the system to change the stored information or data is significantly reduced.

The "display medium" includes recording media such as paper sheets and films, and display media such as CRT display and liquid crystal display.

The subject data to be displayed on the display medium may take the form of descriptions and/or drawings or graphical representations.

According to a first preferred form of the method and system of the present invention, the plurality of classes of the subjects include (a) at least one of a production process class and a working process class, the production process class including at least one of the subjects which comprises at least one of said sets of production-related information which relates to identification of a plurality of production processes for producing each of the products and the parts, the working process class including at least one of the subjects which comprises at least one of the sets of production-related information which relates to identification of a plurality of working processes to be performed for production of each product and the parts in at least one of the production processes, (b) a product class including at least one of the subjects which comprises at least one of the sets of construction-related information which relates to identification of each product, and (c) a part class including at least one of the subjects which comprises at least one of the sets of construction-related information which relates to identification of the plurality of parts of each product, the product class and the part class having a relationship that each subject belonging to the product class is an aggregation of all of the subjects belonging to said part class.

In one arrangement of the above first preferred form of the invention, the above-indicated at least one of the production process class and the working process class has a higher order in hierarchy than the product class and the part class, whereby the sets of construction-related information are related to each of the production and working processes.

In another arrangement of the first preferred form of the invention, the above-indicated at least one of the production process class and the working process class has a lower order in hierarchy than the product class and the part class, whereby the sets of production-related information are related to each of the products and parts.

In a second preferred form of the method and system of this invention, the plurality of classes of the subject include a production process class and a working process class, the production process class including at least one of the subjects which comprises at least one of the sets of production-related information which relates to identification of a plurality of production processes for producing each of the products and the plurality of parts, the working process class including at least one of the subjects which comprises at least one of the sets of production-related information which relates to identification of a plurality of working processes to be performed for production of each product and the parts in at least one of the production processes, the production class having a higher order in hierarchy than the working process.

In one arrangement of the above second preferred form of the invention, the production process class and the working process class having a relationship that each subject belonging to the production process class is an aggregation of all of the subjects belonging to said working process class.

In a third preferred form of the method and system of this invention, the plurality of classes of the subjects include a production process class including at least one of the subjects which comprises at least one of the sets of production-related information which relates to identification of a plurality of production processes for producing each of the products and the parts, and a part rack class including at least one of the subjects which comprises at least one of a plurality of sets of product information including the construction-related information and the production-related information and which relates to location of storage of each of the parts of the products, the production process class having a higher order in hierarchy than the part tack class.

In one arrangement of the above third preferred form of the invention, the production process class and the part rack class have a relationship that each of the production processes which correspond to the subjects belonging to the production process class corresponds to the locations of storage of the parts corresponding to the subjects belonging to the part class.

In a fourth preferred form of the method and system of this invention, the plurality of classes of the subjects include a working process class and a work content class, the working process class including at least one of the subjects which comprises at least one of the sets of production-related information which relates to identification of a plurality of working processes to be performed for production of each product and the parts in at least one of production processes, the work content class including at least one of the subjects which comprises at least one of a plurality of sets of product information including the construction-related information and the production-related information and which relates to contents of the working processes, the working process class having a higher order in hierarchy than the work content class.

In one arrangement of the above fourth form of the invention, the working process class and the work content class have a relationship that each of the working processes which correspond to the subjects belonging to the working process class corresponds to the work contents corresponding to the subjects belonging to the work content class.

In a fifth preferred form of the method and system of this invention, the plurality of classes of the subjects include a working process class and a part group class, the working process class including at least one of the subjects which comprises at least one of the sets of production-related information which relates to identification of a plurality of working processes to be performed for production of each product and the parts in at least one of production processes, the part group class including at least one of the subjects which comprises at least one of a plurality of sets of product information including the construction-related information and the production-related information and which relates to identification of each group of the parts satisfying a predetermined requirement, the working process class having a higher order in hierarchy than the part group class.

In one arrangement of the above fifth preferred form of the invention, the working process class and the part group class have a relationship that each of the working processes which correspond to the subjects belonging to the working process class corresponds to the groups of parts corresponding to the subjects belonging to the part group class.

In a sixth preferred form of the method and system of the invention, the plurality of classes of the subjects include a product class and a part class, the product class including at least one of the subjects which comprises at least one of the sets of construction-related information which relates to identification of each product, the part class including at least one of the subjects which comprises at least one of the sets of construction-related information which relates to identification of the parts of each product, the product class having a higher order in hierarchy than the part class.

In one arrangement of the above sixth preferred form of the invention, the product class and the part class have a relationship that each product corresponding to each subject belonging to the product class is an aggregation of the parts corresponding to the subjects belonging to the part class.

In a seventh preferred form of the method and system of the invention, the plurality of classes of the subjects include a product class and a product group class, the product class including at least one of the subjects which comprises at least one of the sets of construction-related information which relates to identification of each product, the product group class including at least one of the subjects which comprises at least one of a plurality of sets of product information including the construction-related information and the production-related information and which relates to identification of each group of the products satisfying a predetermined requirement, the product group process class having a higher order in hierarchy than the product class.

In one arrangement of the above seventh preferred form of the invention, the product class and the product group group class have a relationship that the products corresponding to the subjects belonging to the product class corresponds to the groups of products corresponding to the subjects belonging to the product group class.

According to an eighth preferred form of the method and system of this invention, the plurality of classes of the subjects include a part class and a graphics class, the part class including at least one of the subjects which comprises at least one of the sets of construction-related information which relates to identification of the parts of each product, the graphics class including at least one of a plurality of sets of product information including the construction-related information and the production-related information and which relates to graphic representations representative of configurations of the parts, the part class having a higher order in hierarchy than the graphics class.

In one arrangement of the above eighth preferred form of the invention, the part class and the graphics class have a relationship that each part corresponding to the subjects belonging to the part class corresponds to the graphic representations corresponding to the subjects belonging to the graphics class.

According to a ninth preferred form of the method and system of the method and system of this invention, the plurality of classes of the subjects include a part class and a part attribute class, the part class including at least one of the subjects which comprises at least one of the sets of construction-related information which relates to identification of the parts of each product, the part attribute class including at least one of the subjects which comprises at least one of a plurality of sets of product information including the construction-related information and the production-related information and which relates to at least one of quality standards, preliminary processes, production cost and legal restrictions of the parts, the part class having a higher order in hierarchy than the part attribute class.

As described above with respect to the various preferred forms of the invention, the sets of construction-related information and the sets of production-related information are determined as the similar subjects, which are classified into the various classes on the basis of the mutual relationships of the individual subjects. These techniques are effective to manage the product information, not only where the production information memory for storing the subject substance data and the relationship substance data consists of a single data storage medium, but also where the production information memory consists of two or more data storage media.

According to a tenth preferred form of the system of this invention, the products consist of different types and models of motor vehicles as the end products, while the parts consist of various parts which are produced or purchased and which are assembled into intermediate products to be assembled into the motor vehicles, and the construction-related information relates the mutual constructional relationships of the end products, while the production-related information relates to a series of operations to manufacture the end products.

In one arrangement of the above tenth preferred form of the invention, the system includes a plurality of information managing devices having respective different functions.

For example, the information managing devices include a production information managing device for managing product design information as the construction-related information, and product manufacturing information as part of the production-related information. The product design information represents relationships between each product and its component parts, while the product manufacturing information represents information necessary to produce the products and their parts.

The production information managing device includes (a) a production information memory for storing production information which comprises the product design information and the product manufacturing information, and (b) data generating and storing means operable in response to commands entered by the user into the production information managing device, for generating the production information and storing the generated production information in the production information memory. The production information memory functions as part of the product information memory.

The information managing devices may include a quality information managing device for managing quality control information as part of the production-related information, the quality control information relating to required qualities of each product and the parts of each product. In this case, the quality information managing device may include reproducing means for reproducing the quality control information in a visible form, such as recording means or display means for printing or displaying the quality control information on a suitable display medium.

The quality information managing device may include (a) a quality information memory for storing the quality control information, and (b) data generating and storing means operable in response to commands entered by the user into the quality information managing device, for generating the quality control information and storing the generated quality control information in the quality information memory. In this case, the quality information managing device may include reproducing means for reproducing the quality control information in a predetermined format. In this case, the quality control information includes an identifier for identifying a content to be reproduced on a suitable output medium, a description of the content, and a graphic representation of the content.

The information managing devices may include both of the production information managing device and the quality information managing device which have been described, and the production information memory of the production information managing device stores descriptive data representative of the description of the content, and graphic data representing the graphic representation of the content. The quality information managing device is adapted to retrieve the descriptive data and the graphic data from the production information memory and provide the description and the graphic representation on the output medium according to the retrieved descriptive data and the graphic data.

According to an eleventh preferred form of the method and system of the present invention, the construction-related information and the production-related information are reproduced on a suitable output medium for each of a plurality of working processes to be performed for producing each of the products and its component parts. In this case, the sets of the construction- and production-related information associated with the desired working process are retrieved and reproduced on the suitable output medium in the predetermined format so that the user or worker observing the reproduced information can easily understand the working process in question.

The construction-related information may be reproduced on the output medium, as graphical representation of the parts, which permits the user or worker to easily recognize the parts in question.

According to a twelfth preferred form of the method and system of this invention, the construction-related information is reproduced on a suitable output medium in a predetermined format having a coordinate system in which the products are taken along one of a horizontal and a vertical axis while the parts are taken along the other of the horizontal and vertical axes. In this case, the desired products whose construction-related information is reproduced are specified in the desired order by the user by respective identification codes, and the parts of each of the products are specified in the order in which the parts are subjected to respective working processes. The format has a matrix of part drawings located at the respective coordinate positions corresponding to the respective combinations of the products and parts. The part drawings showing configurations of the parts of each product.

In the present form of the invention, the relationships between each desired product and its parts are indicated by the part drawings reproduced on the output medium such as a display screen, so that the user observing the reproduced part drawings can easily recognize the relationships between the product and the parts. The present arrangement permits the reproduction of the part drawings of only the selected parts in which the user is interested, such that the part drawings of each product are arranged in the order in which the corresponding parts are subjected to respective working processes. Thus, the information reproduced on the output medium in the predetermined format assures easy understanding of the constructional and manufacturing relationship between the parts of each product.

According to a thirteenth preferred form of the method and system of this invention, the construction-related information for each working process of the parts is reproduced on a suitable output medium in a predetermined format having a coordinate system in which groups of products satisfying a predetermined condition are taken along one of a horizontal and a vertical axis in a desired order, while groups of parts satisfying a predetermined condition are taken along the other of the horizontal and vertical axes in a desired order. The format has a matrix of part drawings located at the respective coordinate positions corresponding to the respective combinations of the product groups and part groups.

The product groups and part groups to be reproduced on the output medium may be selected from the standpoint of the worker engaged in the manufacture of the products, rather than the designers of the products. For example, a product group may consist of products which have different shapes but include the same part or parts. A part group may consist of parts which do not have completely the same specifications but have basically similar configurations and may be subjected to substantially similar working processes. Therefore, the above format of reproduction of the construction-related information on the output medium permits easy understanding of the parts in which the worker is interested According to a fourteenth preferred form of the method and system of this invention, the construction-related information for each working process of the parts of each product is reproduced on a suitable output medium in a predetermined format which includes not only identification codes or numbers of the parts of each product but also simple part drawings showing configurational features of the respective parts.

According to a fifteenth preferred form of the invention, the information to be reproduced on an output medium lists two or more combinations of child or element parts which are selectively used to constitute parent or combination parts.

According to a sixteenth preferred form of the invention, at least one of the construction-related information and the production-related information for each product specified by the user is reproduced on an output medium in a predetermined format which includes identification codes of the parts of each product and part drawings showing the configurations of the parts. In this case, the part drawings are reproduced in the order in which the corresponding parts are subjected to respective working processes.

In a seventeenth preferred form of the system of the present invention, the subject data output device comprises: (a) an output medium for reproducing the at least one of the plurality of subject data; (b) an output information memory for storing layout data and memory location data, the layout data representing a layout of the plurality of sets of element data for each subject to be reproduced at respective positions on the output medium, the memory location data being representing locations of the plurality of sets of element data in the product information memory; (c) storing means operable for storing the layout data and the memory location data in the output information memory, in response to a second data storing operation by the user; and (d) reproducing means for reading out the layout data and the memory location data from the output information memory, to retrieve the at least one of the plurality of subject data from the product information memory, on the basis of the read-out memory location data, and for reproducing the at least one set of subject data on the output medium according to the layout represented by the read-out layout data.

In one arrangement of the above seventeenth preferred form of the system, the sets of construction-related information and the sets of production-related information are stored in the product information memory as first subjects which can be processed similarly, while different layouts of the sets of element data for each first subject to be reproduced at respective positions on the output medium are determined as second subjects which can be processed similarly. In this case, the different layouts are represented by respective sets of layout data which are stored in the output information memory by the storing means. The sets of layout data include at least one set of layout substance data indicative of a substance of each of the different layouts and at least one set of relationship data indicative of a substance of each of extracted at least one relationship of each layout with the other of the other layouts. The reproducing means reproduces the set of subject data incorporating the sets of element data for at least one of the first subjects, according to one of the sets of layout data which corresponds to one of the layouts which is selected by the user.

In this arrangement, only one set of layout data is stored in the output information memory for each of the layouts, and the required data storage capacity of the output information memory can be reduced.

In an eighteenth preferred form of the system of this invention, the system further comprises (a) means for determining each of the sets of construction-related information and the sets of production-related information as a corresponding one of a plurality of objects each of which is constituted according to an object-oriented concept by substantially encapsulating an attribute and a method, (b) means for describing a substance of each object by a cooperative combination of a set of data and a procedure to be applied to the set of data, (c) means for defining the set of data and the procedure of each object as the attribute and the method of each object, respectively, (d) means for extracting at least one relationship of each of the objects with the other objects, (e) means for classifying the objects into a plurality of classes on the basis of the extracted at least one relationship of each object, (f) means for generating a plurality of sets of object data including first data indicative of the substantially encapsulated attribute and method of each object, and second data indicative of the extracted at least one relationship of each object, the first data and the second data being related to each other, (g) data storing means for storing the sets of object data for each object in the product information memory, and (h) data output means for retrieving at least one of the sets of object data from the product information memory, and outputting the sets of object data, and wherein the data storing device includes the data storing means, and the subject data output device includes the data output means.

In the above system, construction-related information and the production-related information are totally managed efficiently according to the object-oriented concept. The present system provides substantially the same advantages as the information managing method described above.

Further, the present system is adapted such that the attribute and method of each object are substnatially encapsulated and have independence from those of the other objects. The separately encapsulated sets of object data for the individual objects can be stored in different memory areas, provided the relationships between the plurality of classes are coordinated among the different memory areas. That is, the product information memory may consist of two or more memories or data bases disposed at respective different sections or departments of the manufacturer of the products. Thus, the present system permits efficient management of the product information, and reduced data storage capacity of each memory or data base used for storing the object data.

According to a third aspect of this invention, there is provided an apparatus comprising (i) a product information storing portion for storing a plurality of sets of product information in relation to each other, the sets of product information including data relating to a production process of each of at least one product, data relating to working processes performed in the production process, data relating to parts which constitute each product, data relating to drawings of each product and the parts thereof, and data relating to required quality of assembling of the parts into each product, (ii) a data generating portion for receiving the sets of product information from the product information storing portion, and generating work managing information necessary to manage the working processes of each product, on the basis of the received sets of product information, and (iii) a managing information storing portion for storing the generated work managing information.

In the present apparatus, the work managing information necessary to control the working processes to produce each product can be readily generated on the basis of the product information stored in the product information storing portion in which the above-indicated various kinds of data are related to each other.

In one preferred form of the above apparatus, the work managing information is related to the product information, so that the work managing information is altered when the product information is altered.

The above arrangement assures generation of the work managing information which is altered upon alteration of the product information.

BRIEF DESCRIPTION OF THE DRAWINGS

The above and optional objects, features, advantages and technical and industrial significance of the present invention will be better understood by reading the following description of presently preferred embodiments of the invention, in connection with the accompanying drawings, in which:

FIG. 22 is a view showing a still further display content on the display screen;

FIGS. 23–27 are a flow chart illustrating an operation of a computer by a user of the quality information managing device to generate data files;

FIG. 34 is a view showing a data file for an output form of product design information, according to still another embodiment of this invention.

DETAILED DESCRIPTION OF THE PREFERRED EMBODIMENTS

Where will be described a product information managing method and a product information managing system according to one embodiment of the present invention, which are adapted to totally or synthetically manage various kinds of information associated with a series of processes to manufacture motor vehicles. The manufacture of the motor vehicles includes production and purchase of a multiplicity of component parts, assembling of these parts into intermediate products, and assembling of these intermediate products into the motor vehicles as the end products.

Figure 1:
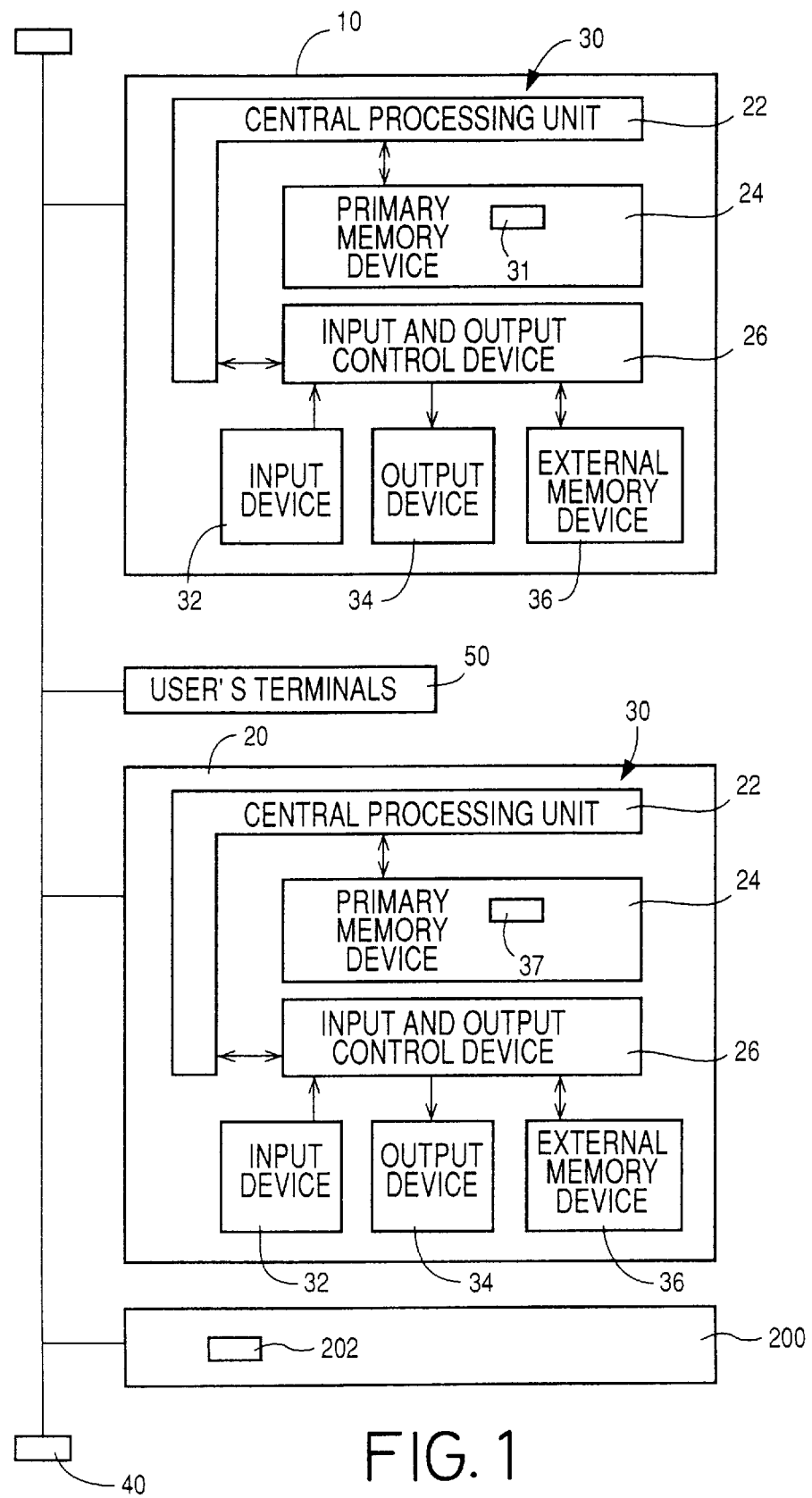
FIG. 1 is a block diagram view schematically showing a hardware arrangement of a product information managing system constructed according to one embodiment of the present invention.

As shown in FIG. 1, the product information managing system includes two discrete information managing devices in the form of a production information managing device 10 and a quality information managing device 20.

The production information managing device 10 is arranged to manage primarily product design information and product manufacturing information. The "product design information" includes information indicative of constructional relationships between various types and models of motor vehicles (end products) and intermediate products (e.g., assemblies and units), information indicative of constructional relationships between each intermediate product and component parts constituting the intermediate product, and information indicative of constructional relationships between each end product and the component parts. The "product manufacturing information" includes information necessary to manufacture the intermediate and end products (hereinafter referred to collectively as "products") and the component parts of the products.

The quality information managing device 20 is arranged to manage primarily quality control information necessary to assure the desired quality of the products and parts. The quality control information includes quality control standards, for example. The "quality control standards" are requirements that must be satisfied by the parts and products in relatively important aspects and characteristics or properties thereof. The requirements include the contents of the characteristics or properties to be checked, the departments and sections responsive for the quality control checking, the time schedule of the checking, the sampling rules, and so forth. The characteristics or properties in question define the quality of the products or parts.

The quality information managing device 20 is also adapted to print out and display quality control information according to various data files which will be described. The printing is effected on a suitable recording medium, to provide an output form in a predetermined format. The same output form is used for displaying the quality control information.

Figure 2:
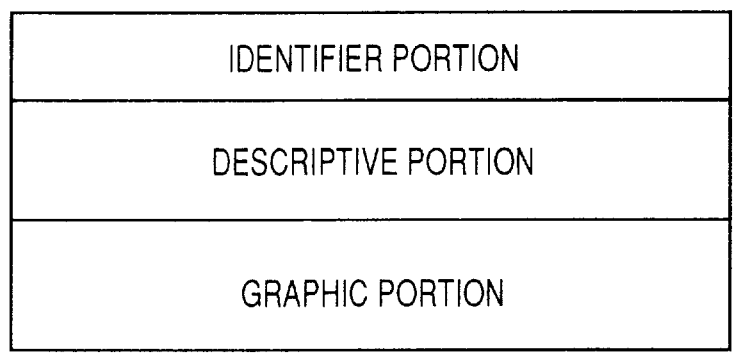
FIG. 2 is a view schematically showing an arrangement of an output form in which quality control information is printed, displayed or otherwise reproduced by quality information managing device of the product information managing system of FIG. 1.

An example of the output form of the quality control information is illustrated in FIG. 2. The form consists of an identifier portion, a descriptive portion and a graphic portion. The identifier portion identifies the content of the form in question. For instance, the identifier portion includes characters such as "QUALITY CONTROL STANDARDS". The descriptive portion is used for describing the items of the quality control, details of the standards such as tolerances and limits, and any other quality control descriptions as needed. The graphic portion is used for graphical representation of the product in question and its component parts, such as assembly drawing and part recognition drawings. The assembly drawing includes drawing figures of the component parts of the product in question, and a drawing indicating the assembling procedure of the parts. The part recognition drawings are drawings which show configurational features or characteristics of parts which are effective to distinguish these parts from each other even where the parts are similar in configuration.

Figure 3:
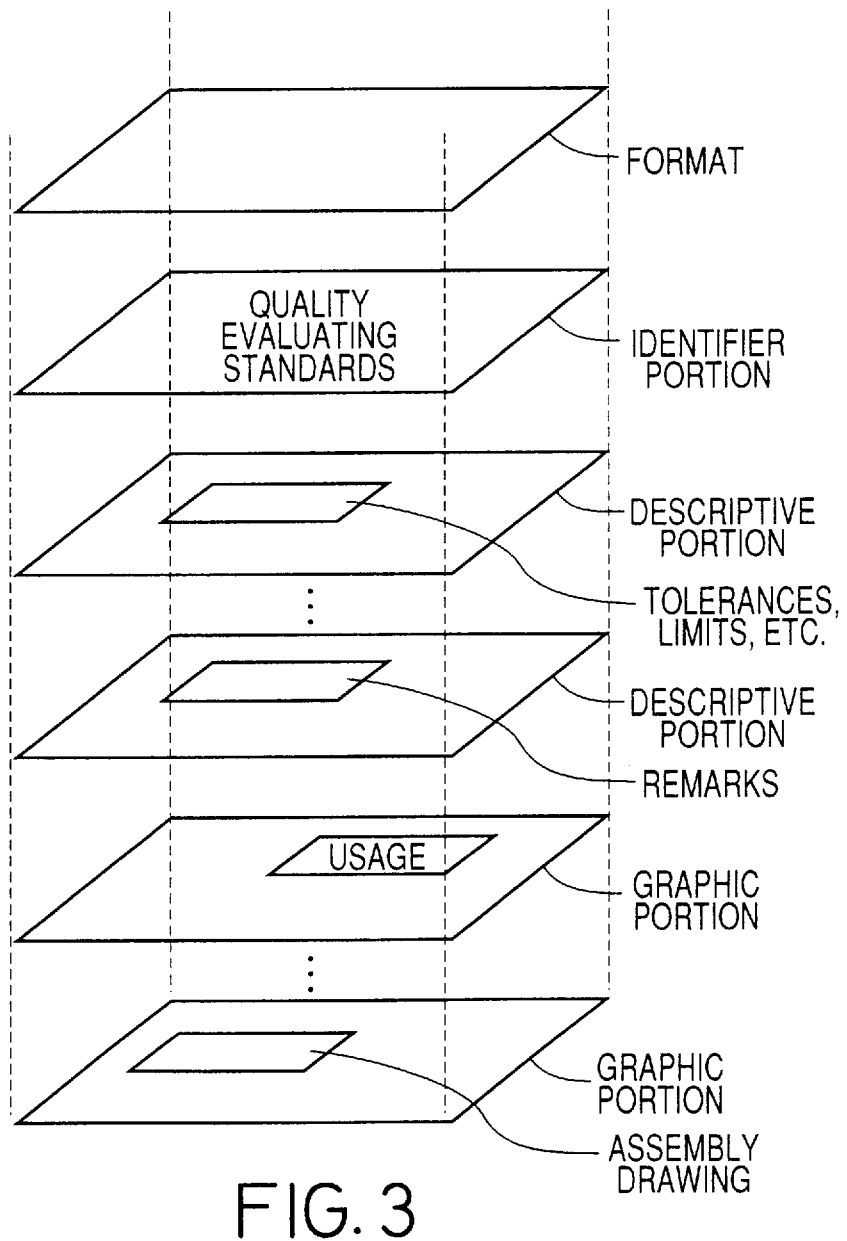
FIG. 3 is a view illustrating hierarchical arrangement of elements of the output form of FIG. 2.

Each form produced according to an appropriate data file consists of two or more elements, which may be schematically represented by respective planes in a predetermined hierarchical arrangement as illustrated in FIG. 3. Namely, an example of a model of an output form is illustrated in FIG. 3.

Figure 4:
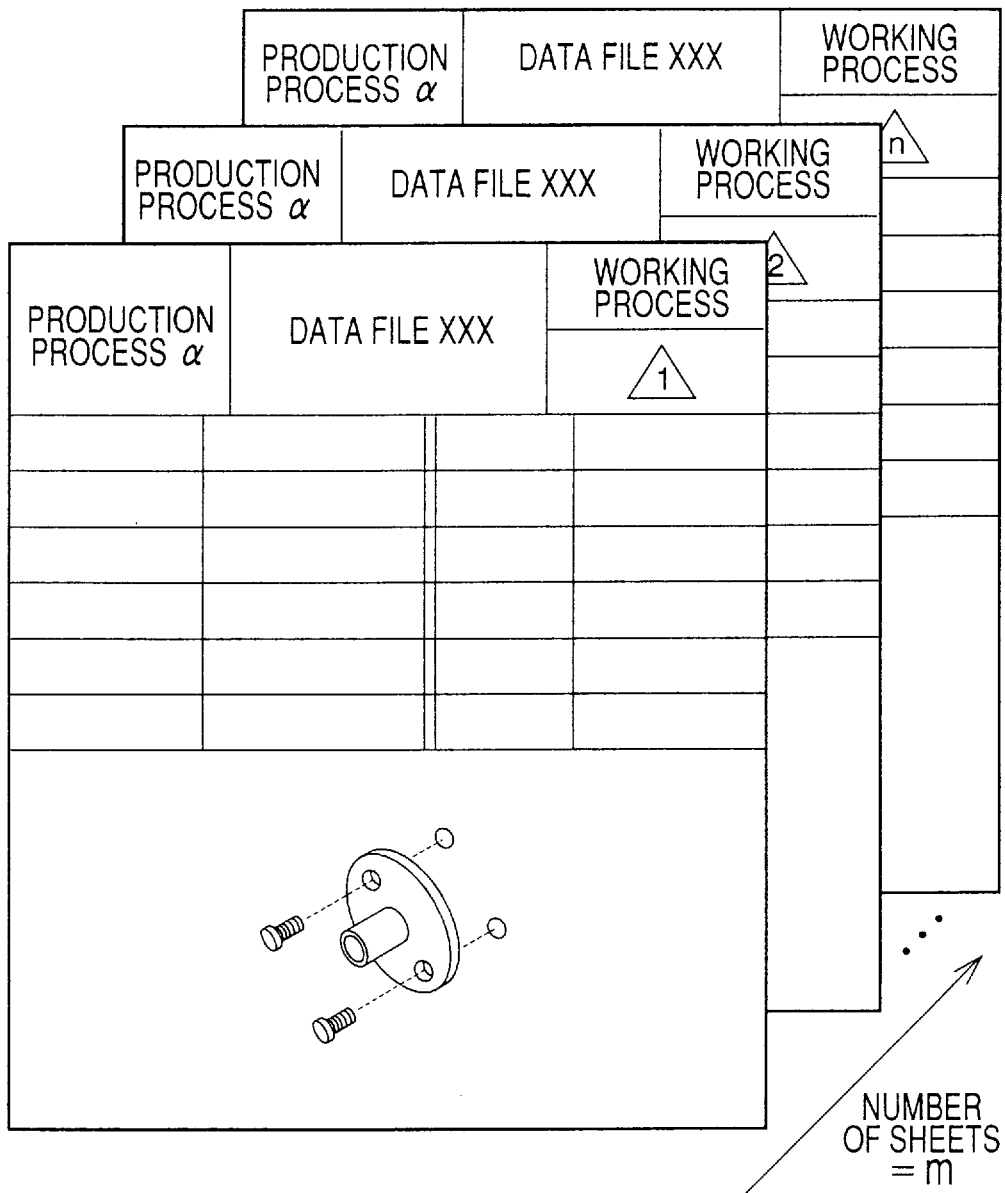
FIG. 4 is a view showing an example of the content of the output form of FIG. 2.

The quality control information may be represented by various forms having appropriate formats. FIG. 4 illustrates an example of forms for quality control information associated with working processes in a given production process. In the example of FIG. 4, the number ("1", "2" . . . "n") in a triangle at the upper right corner of each form represents the working process number. That is, the numbers indicate the order in which the appropriate working processes are performed, and the order in which the forms are prepared.

Referring back to the block diagram of FIG. 1, there will be described the hardware arrangements of the managing devices 10, 20.

The production information managing device 10 is constituted principally by a computer 30 which incorporates a central processing unit 22, a primary memory device 24 and an input and output control device 26. The primary memory device 24 includes a production information memory 31 for storing production information which includes the product design information and the product manufacturing information which have been described above. To the input and output control device 26, there are connected an input device 32, an output device 34 and an external memory device 36.

The input device 32 is provided for the user of the present system to enter desired commands and data into the computer 30. The input device 32 includes a keyboard and a mouse. The output device 34 provides an output of desired data such as the forms indicated above, and includes a display device such as a CRT display or a liquid crystal display, and a printer. The external memory device 36 is provided to write and read information on and from a suitable magnetic data storage medium such as a floppy disk and a hard disk.

The quality information managing device 20 has the same hardware arrangement as the production information managing device 10. Namely, the device 20 is constituted principally by the computer 30 incorporating the central processing unit 22, primary memory device 24 and input and output device 26 which have been described above with respect to the device 10. The primary memory device 24 includes a quality information memory 37 for storing the quality control information discussed above. As in the production information managing device 10, the input device 32, output device 34 and external memory device 36 are connected to the input and output control device 26 in the quality information managing device 20.

In the present product information managing system, the production information memory 31 and the quality information memory 37 function as part of a product information memory for storing the product information which includes the product design information, product manufacturing information and quality control information. The product design information falls within a concept of construction-related information indicative of constructional relationship between each product and parts constituting the product. The product manufacturing information and the quality control information fall within a concept of production-related information relating to the production of the products and the parts thereof.

As indicated in FIG. 1, the information managing devices 10, 20 constitute a part of a network 40, in which the devices 10, 20 function as servers. The network 40 also includes users' terminals 50 which are used to command the serves 10, 20 to perform requested data processing operations.

Figure 5:
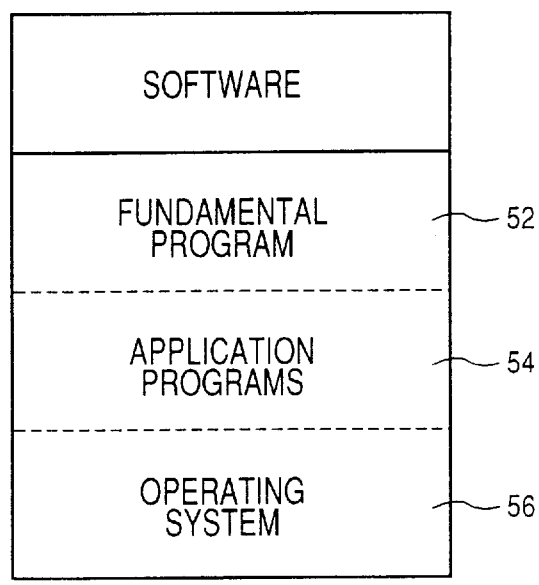
FIG. 5 is a view schematically showing a software arrangement of the product information managing system of FIG. 1.

Referring to FIG. 5, there is schematically illustrated a software arrangement of the information managing devices 10, 20.

The software of each of these information managing devices 10, 20 includes a fundamental program 52, application programs 54, and an operating system (OS) 56. The fundamental program is a basic program for operating the computer 30, and the operating system OS is formulated to assure efficient operation of the computer 30, that is, to control the execution of the fundamental program 52 and the application programs 54 and to manage peripheral devices.

Figure 19:
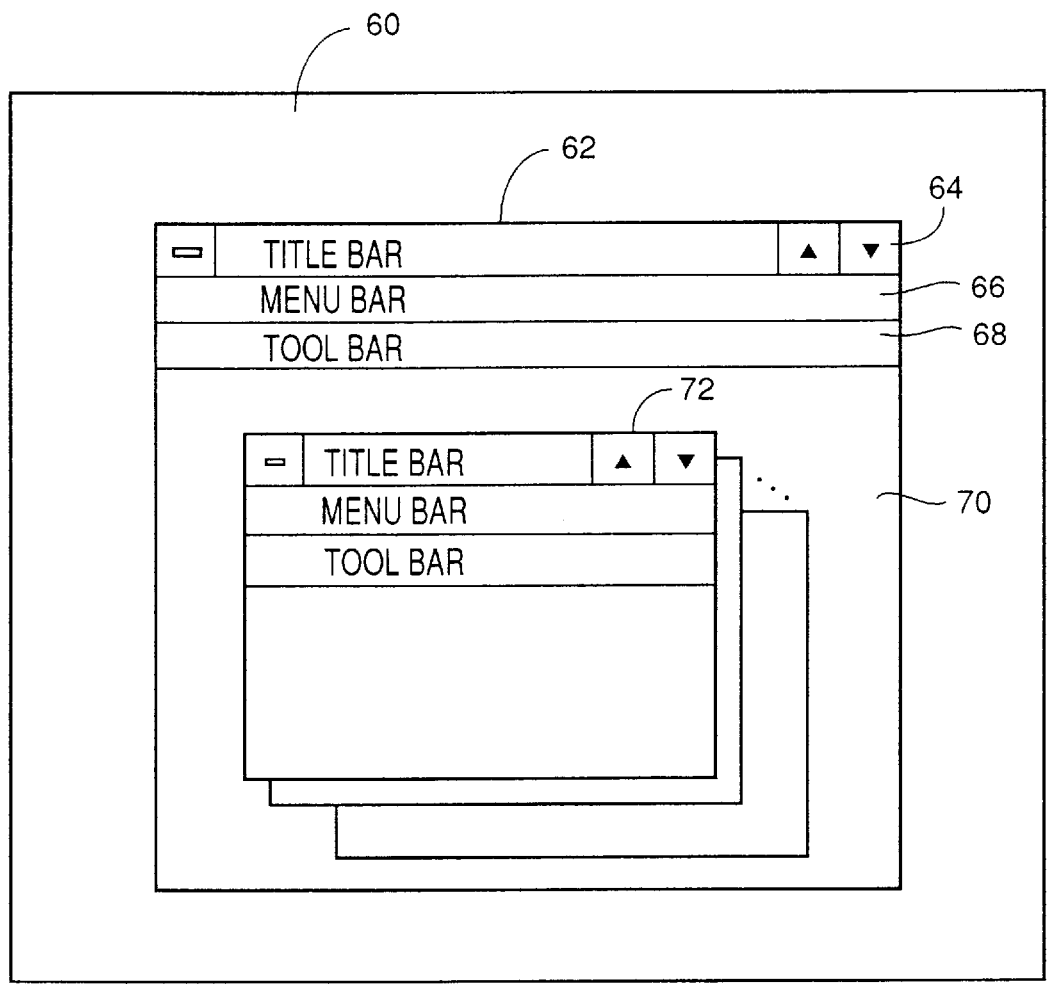
FIG. 19 is a view showing an initial display content on a display screen of a display device in the quality information managing device.

The operating system OS 56 includes, for example, a display control program formulated to provide menus including icons on the display screen, and to position a cursor to desired positions on the menus for selecting desired icons in response to an operation of the mouse, so that desired data are read out from the appropriate memories and displayed on the screen, and are stored in the memories. Thus, the display control program has a GUI (graphical user interface) function, and a multiple-window function for providing a plurality of windows on the display screen so that different kinds of data are displayed in respective areas of the screen, as indicated in FIG. 19 by way of example.

The application programs 54 are programs for operating the computer 30 to achieve respective purposes or objectives. The application programs 54 are selectively read out from the magnetic data storage medium in the external memory device 36 under the control of the computer 30. These application programs 54 are described in an object-oriented programming language.

The object-oriented programming language and object orientation technology are described, for example, in "Data Base", K. Uota and T. Koikari, Feb. 3, 1995, second printing, Nikkagiren Publishing Company, Tokyo, Japan, and are known in the art. The object-orientation concept as described in this publication is summarized as follows:

The "object orientation" is a concept of realizing on a software an actual world recognized by a human being. The "object" is a processing unit wherein data and a method representative of an action of the data (action of an object) are integrated or encapsulated.

The method gives an action to the object. The object has a concept of "message" which is a program element for operating the object. The object is given an action when the message is received. That is, the message is a programming means in the object-oriented programming language. The action procedure effected by the message is called a "method".

Each object is expressed by an object model, which is obtained by extracting a plurality of objects from an actual world in question, and systematically classifying the extracted objects into a plurality of object classes in a hierarchical arrangement, while extracting relationships between the object classes. The objects belonging to each object class are referred to as "instances" of the class.

Figure 7:
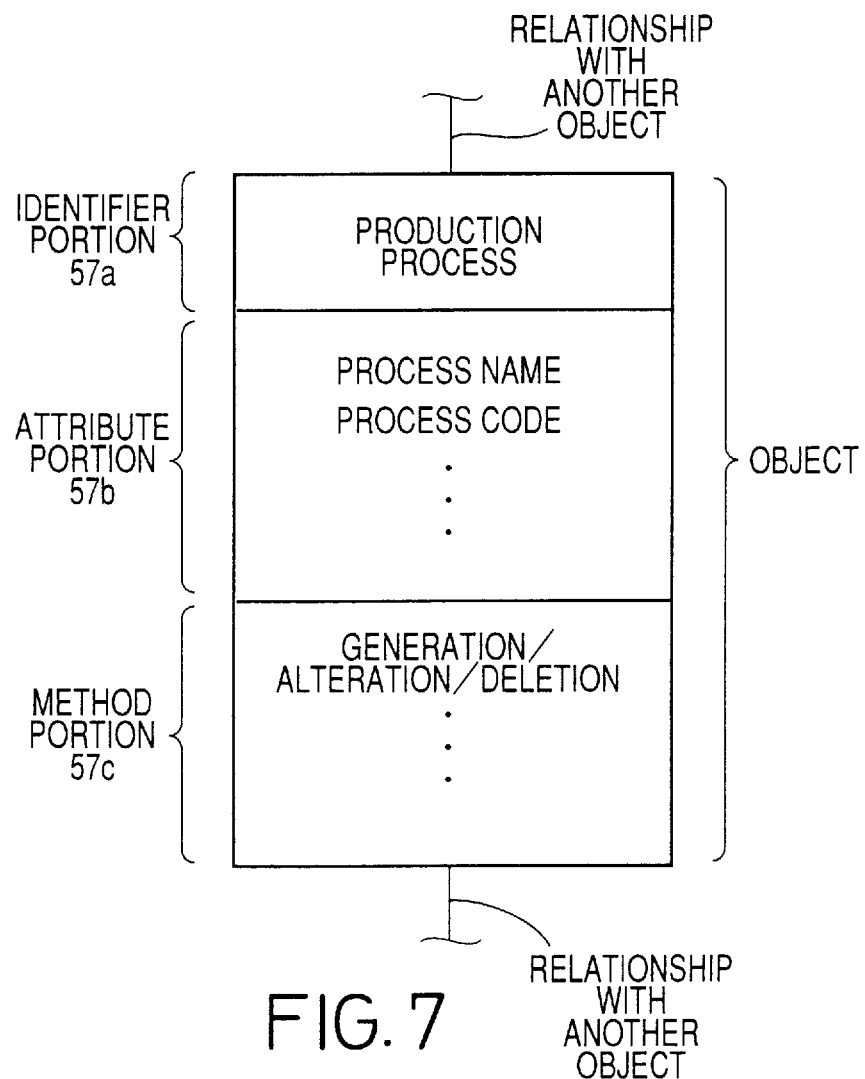
FIG. 7 is a view showing a part of an object model adopted by the production information managing device.

An example of an object class is illustrated in FIG. 7. This object class is associated with a production process. As indicated in the figure, each object class consists of an identifier portion 57a, an attribute portion 57b and a method portion 57c. The identifier portion 57a identifies the object class. The attribute portion 57b describes the content of the object class. The method portion 57c describes a plurality of methods in a predetermined order, which methods realize the action of the object class in question. With these methods implemented by the computer 30, the object class is given the predetermined action.

The mutual relationships of the object classes are defined by the computer 30 on the basis of class relationship data (relationship substance data) which are entered by the user and which represent the relationships between the plurality of objects which belong to the appropriate object classes. The relationships of the object classes may include generalization, specialization, aggregation and decomposition. Namely, the user enters class specifying data in relation to each of the objects, to specify the object class to which each object belongs, so that the encapsulated attribute data and method data of each object are related to the class relationship data corresponding to the object class to which each object belongs. In the present embodiment, the attribute data and method data are examples of a plurality of sets of element data of subject data which are stored in the product information memory 31, 37.

The substance of the relationships between the object classes is defined in the same manner in two or more different sections or departments of the manufacturer of the products in the form of motor vehicles. That is, common object models are employed in these different departments, so that each object can be handled in the same manner in the different departments.

With the common object models employed in the different departments, the attribute data and the method data which are encapsulated for each object, and the class relationship data are related to each other, and cooperate to constitute sets of objects data, which are examples of the subject data indicated above.

The "object-oriented programming language" has an inheritance function in which a property (such as the attribute and method) defined by a high-order object class is inherited by a low-order object class. Where a new object class is added, therefore, it is necessary to add only a definition inherent to that new object class. Namely, only the definition which does not exist in the existing object classes is added.

The application programs 54 will be described in detail. The application programs 54 for the production information managing device 10 are different from those for the quality information managing device 20.

The application programs 54 for the production information managing device 10 will be explained first.

Figure 6:
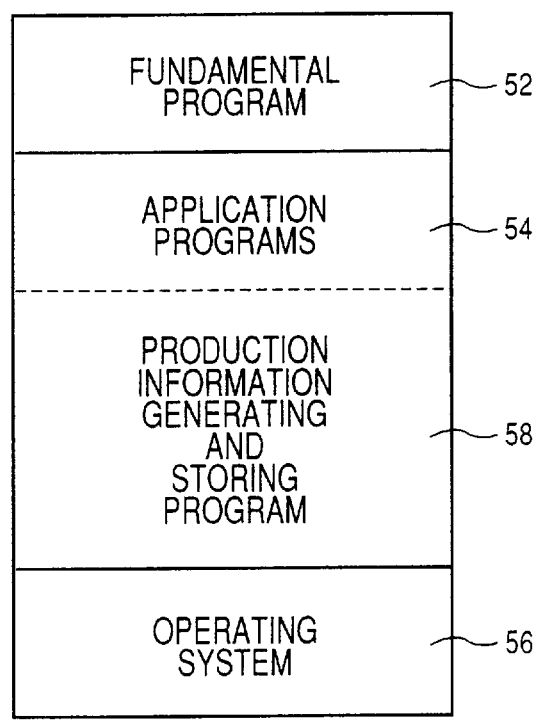
FIG. 6 is a view schematically showing a software arrangement of a production information managing device of the system of FIG. 1.

Each application program 54 for the production information managing device 10 includes a production information generating and storing program 58, as indicated in FIG. 6. This program 58 is executed by the computer 30 according to commands generated as a result of operation by the user. The production information generating and storing program 58 is an object-oriented program formulated to generate the production information (product design information and product manufacturing information) and store the generated production information in the production information memory 31.

The production information generating and storing programs 58 are formulated according to object models which achieve the desired purposes. In the present system adapted to deal with information relating to motor vehicles as the end products, the object models cover tangibles in the form of the end products (motor vehicles) and component parts of the end products, and intangibles in the form of production or working processes. The object models are generated on the basis of relationships between the tangibles and the intangibles. Namely, a plurality of sets of product design information and a plurality of sets of product manufacturing information are treated as respective objects. These objects are systematically classified into a plurality of object classes in a hierarchical arrangement, on the basis of the relationships between the tangibles (motor vehicles and parts) and the intangibles (production processes). Thus, the object models are obtained.

The object models are characterized in that the component design information can be readily and reliably retrieved from the production information memory 31, for each of the production processes and for each of the working processes in each production process, since the sets of product design information are stored in relation to the appropriate production processes and the working processes, which are performed in predetermined orders.

Figure 8:
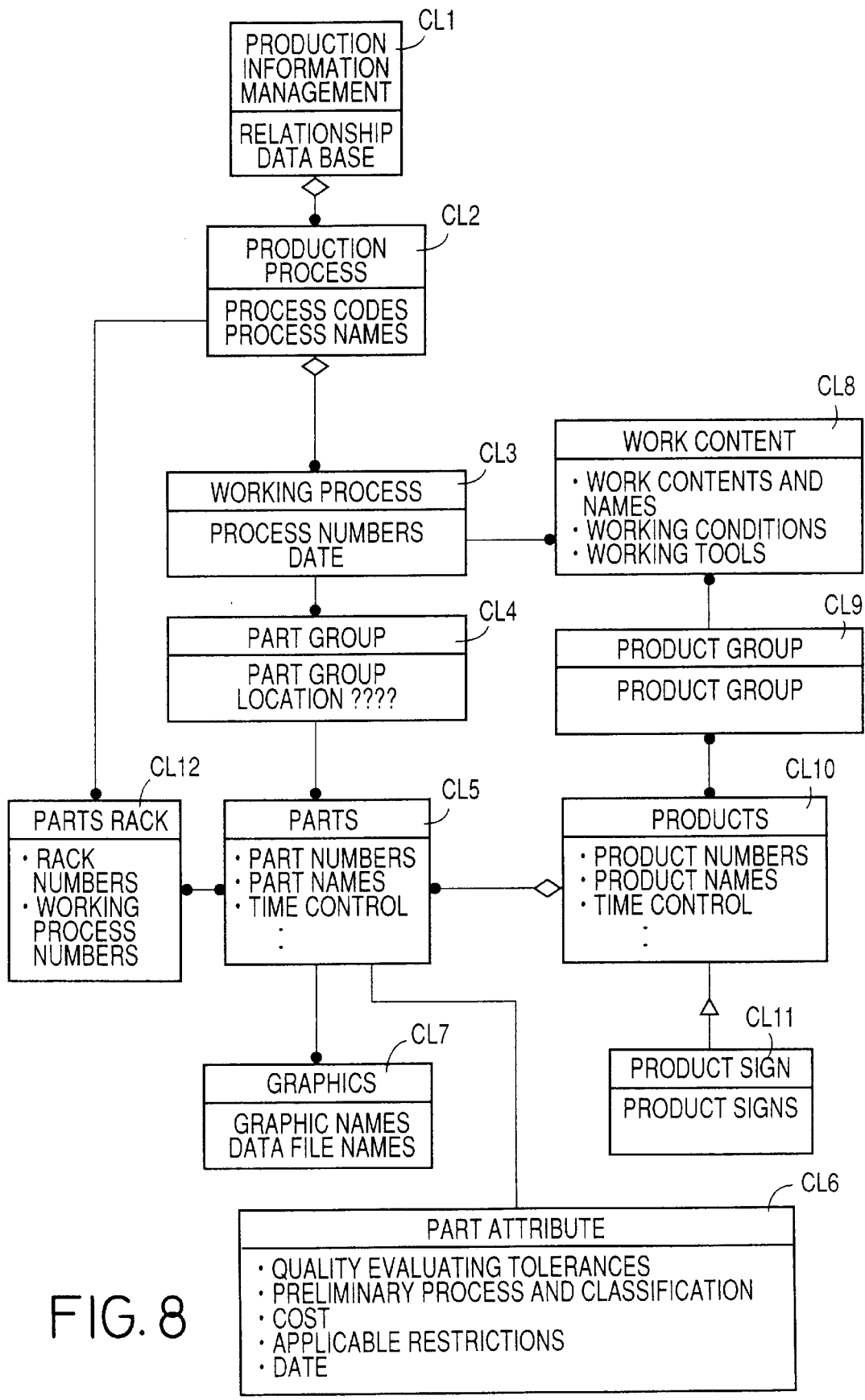
FIG. 8 is a view showing the entirety of the object model.

An example of an object model is illustrated in FIG. 8, which is an object model diagram in which the relationships between the object classes CL are described by graphical symbols. When the method portion 57c of each object is executed, a result of the execution is indicated on the display screen of the output device 34, so that the content of the method portion 57c can be specified on the basis of the relationship between the content of the display and the operating procedure of the computer 30. In this respect, only the identifier portion 57a and the attribute portion 57b of each object are indicated in FIG. 8, and the method portion 57c will be described later.

In the object model of FIG. 8, a production information management class CL1 has a relationship with a production process class CL2. The production information management class CL1 has a relationship data base DB as the attribute. The relationship data base DB is a data base representative of various relationships expressed in a table. The production process class CL2 has, as the attribute, process codes representative of production process to manufacture a product or its component parts, and process names identifying the processes.

The relationship between the production information management class CL1 and the production process class CL2 is so-called "aggregation". Described more specifically, one instance of the production information management class CL1 is an aggregation of all instances of the production process class CL2. If all of the instances of the class CL2 are deleted, the corresponding instance of the class CL1 is deleted. In FIG. 8, this aggregation relationship of the classes CL1 and CL2 is expressed by a diamond symbol located adjacent to the lower side of the rectangular block of the class CL1 and a black dot adjacent to the upper side of the rectangular block of the class CL2.

The "aggregation" is a concept from the standpoint of the production process class CL2 with respect to the production information management class CL1. The relationship of these classes CL1, CL2 from the standpoint of the class CL1 is referred to as "decomposition".

The production process class CL2 has also a relationship with a working process class CL3. The working process class CL3 has, as the attribute, process numbers indicative of the order in which the working processes are implemented. The relationship between the classes CL2, CL3 is such that one instance of the class CL2 is an aggregation of all instances of the class CL3.

The working process class CL3 has also a relationship with a part group class CL4. The part group class CL4 has, as the attribute, information indicative of a group of parts which constitute a given product. The relationship of these classes CL3 and CL4 is such that one instance of the class CL3 corresponds to all instances of the class CL4, and such that the instance in question of the class CL3 is not deleted even if all the instances of the class CL4 are deleted. This relationship is expressed by a black dot symbol adjacent to the upper side of the rectangular block of the class CL4.

The part group class CL4 has also a relationship with a parts class CL5. The parts class CL4 has, as the attribute, part numbers indicative of the numbers of the parts, part names identifying the parts, and time control indicative of the life cycle of the parts. These classes CL4, CL5 have the same relationship as the classes CL3, CL4.

The parts class CL5 has also a relationship with a part attribute class CL6. The parts attribute class CL6 has, as the attribute, quality evaluating tolerances and limits, preliminary processes and cost data of the part in question. The relationship between the classes CL5, CL6 is such that one instance of the class CL5 corresponds to one instance of the class CL6.

The part group class CL4 has also a relationship with a graphics class CL7. The graphics class CL7 has, as the attribute, names of graphics representative of the parts, and names of data files storing the graphics. The relationship between the classes CL4, CL7 is the same as the relationship between the classes CL3, CL4.

The working process class CL3 has also a relationship with a work content class CL8. The work content class CL8 has, as the attribute, the contents and names of the working processes, working conditions and working tools used for the working processes. The relationship of the classes CL3, CL8 is the same as the relationship between the classes CL3, CL4.

The work content class CL8 has also a relationship with a product group class CL9. The product group class CL9 has, as the attribute, information indicative of a group of products. For instance, the group of products may consist of products which use the same part or parts. The relationship of the classes CL8, CL9 is such that one instance of the a class CL9 corresponds to all instances of the class CL8, and such that the instance in question of the class CL9 is not deleted even if all the instances of the class CL8 are deleted.

The product group class CL9 has also a relationship with a products class CL10. The products class CL10 has, as the attribute, numbers and names of the products, and the time control data. The relationship of the classes CL9, CL10 is such that one instance of the class CL9 corresponds to all instances of the class CL10, while one instance of the class CL10 corresponds to all instances of the class CL9, such that the instance in question of the class CL9 is not deleted even if all the instances of the class CL10 are deleted, and such that the instance in question of the class CL10 is not deleted even if all the instances of the class CL9 are deleted.

The products class CL10 has also a relationship with a product sign class CL11. The product sign class CL11 has, as the attribute, signs indicative of the products. The relationship between the classes CL10, CL11 is so-called "generalization". Described in detail, instances of the class CL11 are instances of the class CL10, and the instances of the class CL11 inherit the properties of the instances of the class CL10. The "generalization" is a relationship from the standpoint of a high-order class with respect to a low-order class, wherein the low-order class is encompassed by the high-order class. This relationship is expressed by a triangular symbol placed on a line connecting the lower side of the rectangular block of the class CL10 and the upper side of the rectangular block of the class CL11.

In the present example, the "generalization" is a concept from the standpoint of the product sign class CL11 with respect to the products class CL10. The relationship from the standpoint of the products class CL10 with respect to the product sign class CL11 is "specialization".

The products class CL10 has also a relationship with the parts class CL10. The relationship between these classes CL10, CL5 is the so-called "aggregation", wherein one instance of the class CL10 is an aggregation of all instances of the parts class CL5. This relationship indicates the parts which constitute a given product.

The production process class CL2 has also a relationship with a parts rack class CL12. The parts rack class CL12 has, as the attribute, numbers indicative of racks in which the parts are stored. The relationship between the classes CL2, CL12 is the same as the relationship between the classes CL2, CL4.

The parts class CL5 also has a relationship with the parts rack class CL12. The relationship between these classes CL5, CL12 is the same as the relationship between the classes CL9 and CL10.

According to the object model illustrated in FIG. 8, various kinds of information which are managed by the production information managing device 10 are systematically classified into object classes, irrespective of whether the information is associated with the tangible products and parts or the intangible processes, and such that any kind of information does not exist in two or more related classes.

In the hierarchical arrangement of the present object model, the production process class CL2 and the working process class CL3 are considered to be the high-order classes, while the part group class CL4, parts class CL5, product group class CL9 and products class CL10 are considered to be the low-order classes. As indicated above, the object model is formulated on the basis of the order of the production and working processes, and the product design information are related to of the production and working processes.

There will next be described the manner in which the production information is generated according to the present object model and stored in the production information memory 31.

When the user of the present product information managing system wishes to generate the production information according to the object model and store the generated production information in the memory 31, the computer 30 should be loaded with definitions representative of the content of the production information and the relationships between the different kinds of information. The definitions should meet predetermined rules, which are presented to the user upon execution of the method portion 57c of the object class in question. Typical ones of those rules will be explained.

Initially, the rules for defining a relationship between tangibles (products and parts) will be described.

Figure 9:
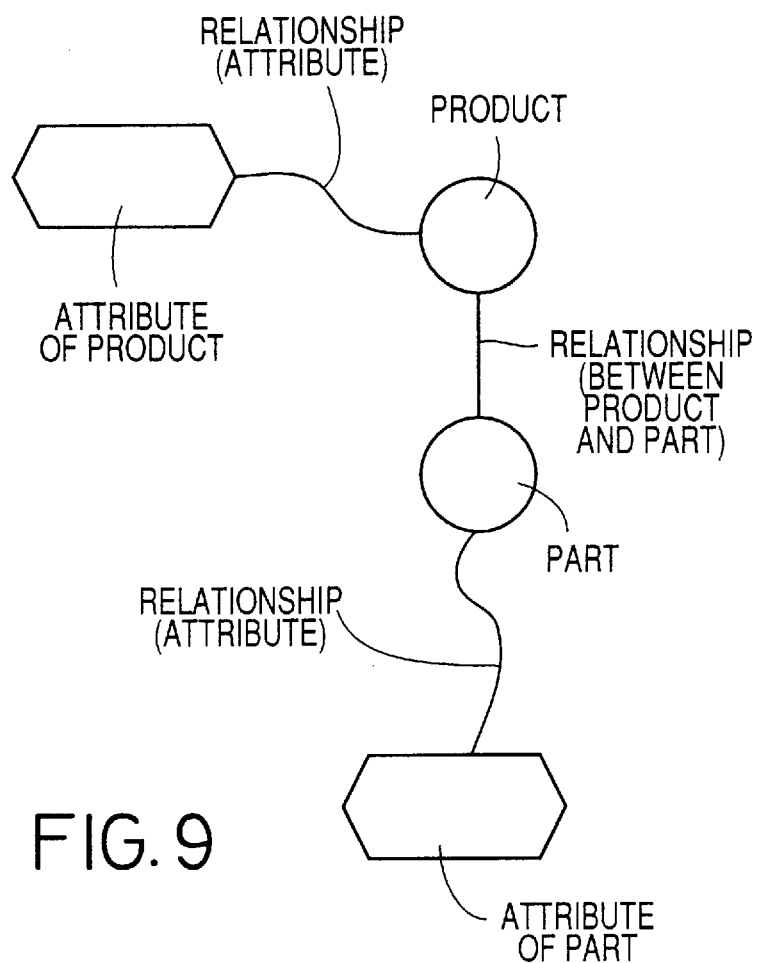
FIG. 9 is a view schematically indicating a plurality of sets of production information which are stored in a production information memory of the production information managing device, in relation to each other according to an object-oriented concept.

When the relationship between the tangibles is defined, the production information should be stored in the production information memory 31, so as to satisfy the following rules: the rule that a product and parts are related to each other such that each of the parts is a component of the product; the rule that a product and an attribute are related to each other such that the product has the attribute; and the rule that each part and an attribute are related to each other such that the part has the attribute. These rules are illustrated in FIG. 9.

Figure 10:
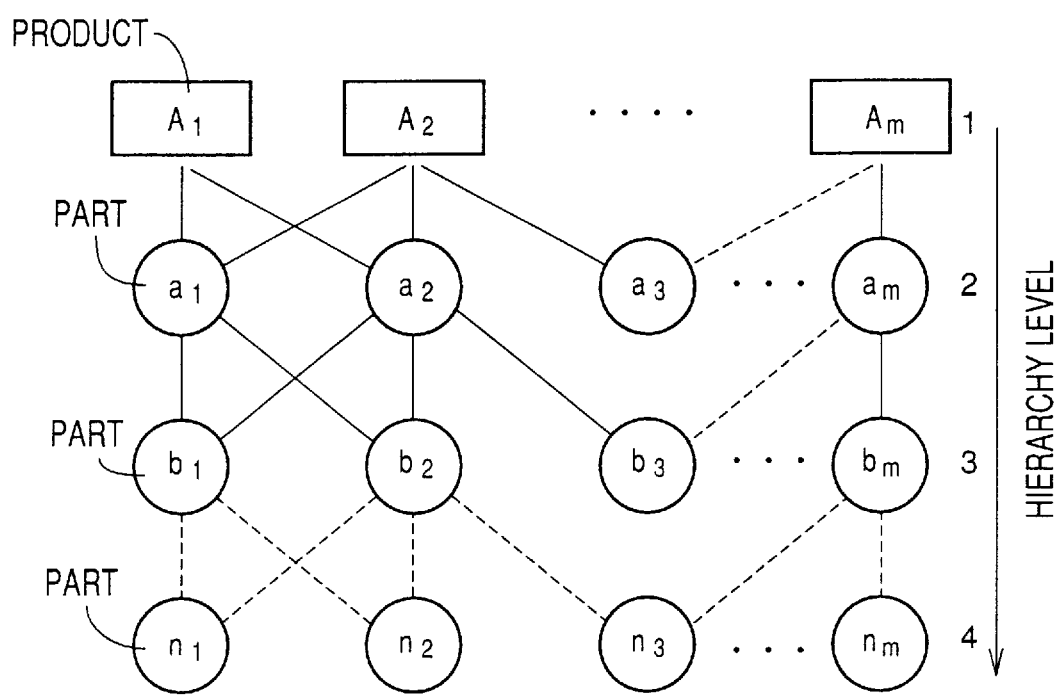
FIG. 10 is a view illustrating a hierarchical relationship of products and parts used for the products.

The relationship between products and parts may be expressed as a hierarchical network as indicated in FIG. 10, in which the products are high-order object classes while the parts are low-order object classes. The hierarchy level is indicated by 1, 2, 3 and 4 in FIG. 10.

Figure 11:
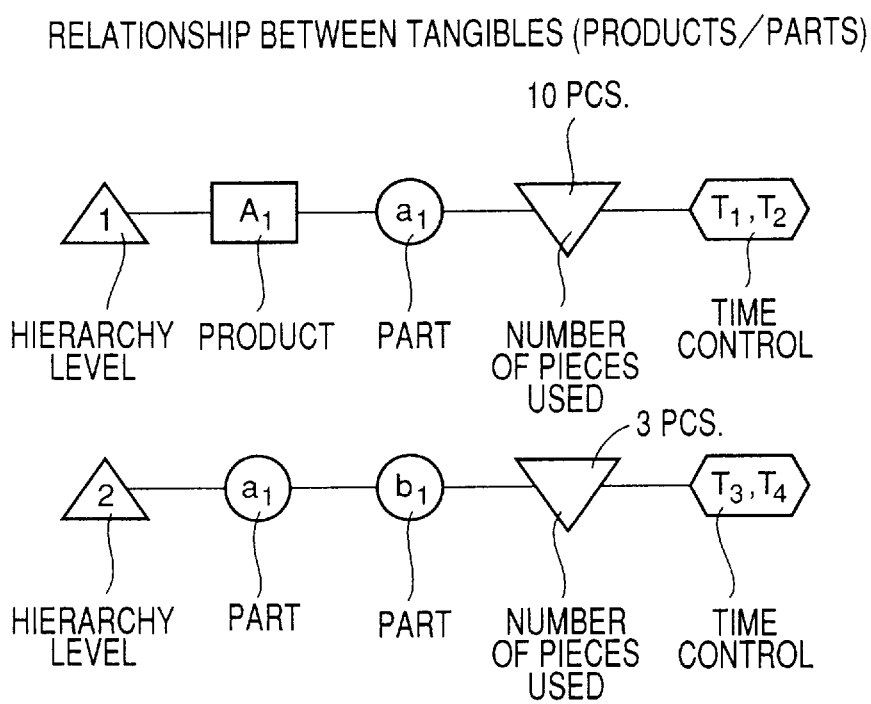
FIG. 11 is a view indicating a definition of a relationship between tangibles, used in the production information managing device of the system of FIG. 1.

Accordingly, the relationship between the tangibles is defined as indicated in FIG. 11 such that the hierarchy level, product name and part name are related to each other. In the present embodiment, the relationship is further defined by the number of the parts used, and the time control indicative of the life cycle of each part.

There will next be described the rules for defining a relationship between a tangible product or part and an intangible process.

Figure 12:
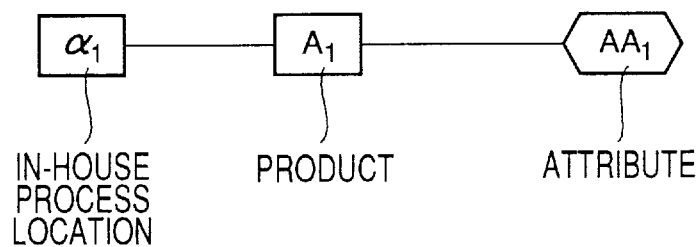
FIG. 12 is a view indicating a definition of a relationship between a product as a tangible and a process as an intangible, used in the production information managing device.
Figure 13:
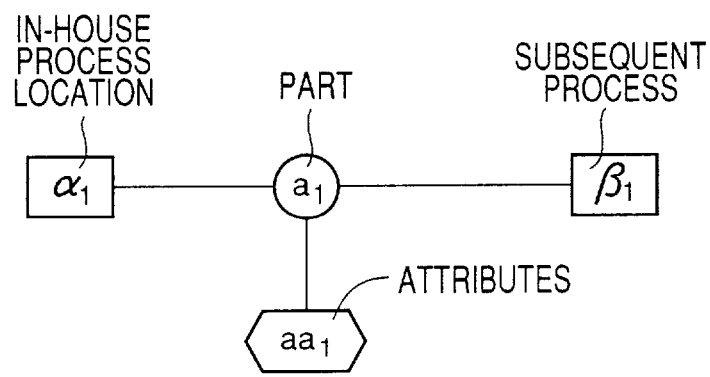
FIGS. 13(a) and 13(b) are views indicating definitions of a relationship between a part as a tangible and a process as an intangible, used in the production information managing device.
Figure 13:
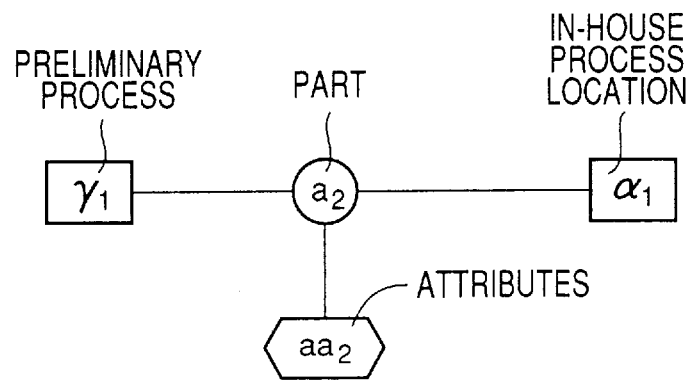

The rules differ depending upon whether the tangible is a product or a part. Where the tangible is a product, the relationship is defined such that the location of an in-house process, product and attribute of the product are related to each other, as indicated in FIG. 12. The in-house process is a process performed in a manufacturer of the product in question. Namely, no parts of the product are purchased.

Where the tangible is a part which is manufactured by the manufacturer of the product and is then subjected to a subsequent process, the relationship is defined such that the location of the in-house process, part, attribute of the part and subsequent process are related to each other, as indicated in FIG. 13(*a*). Where the tangible is a part which is manufactured in a preliminary process and is then subjected to an in-house process, the relationship is defined such that the preliminary process, part, attribute of the part and the in-house process are related to each other, as indicated in FIG. 13(*b*).

Then, the rules for defining a relationship between production and working process and tangibles (products and parts) will be described.

Figure 14:
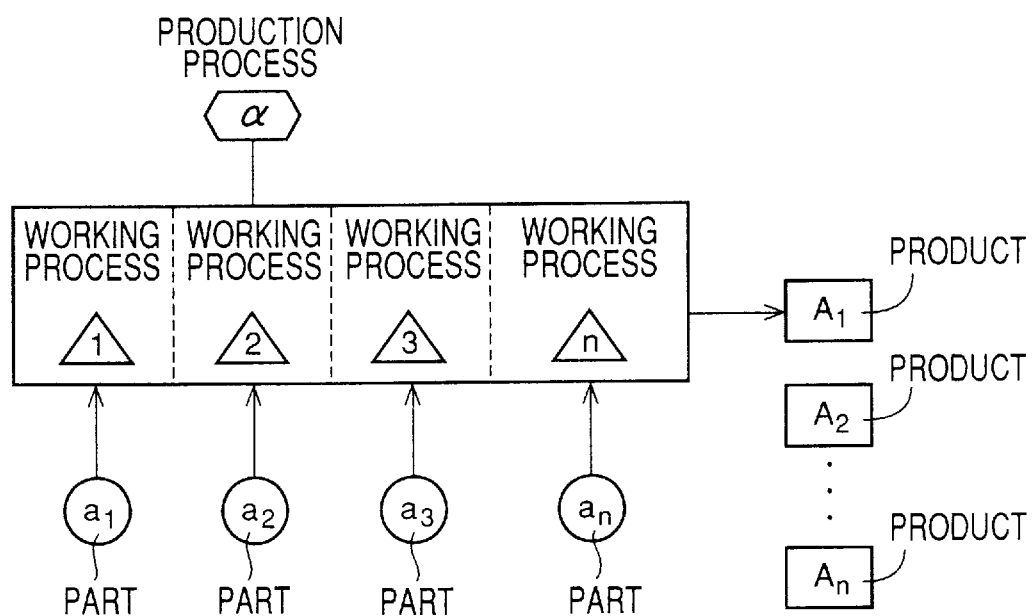
FIG. 14 is a a view indicating a definition of a relationship between production and working processes and tangibles, used in the production information managing device.

In this case, the relationship between the production and working processes and the tangible products and parts is defined such that the production processes, working processes of each production process, parts associated with each working process, and products manufactured by the production processes are related to each other, as indicated in FIG. 14. The numbers in triangles in FIG. 14 indicate the order in which the working processes are performed.

With the definitions of the relationships thus entered by the user, the production information is stored in the production information memory 31 according to the production information generating and storing program 58.

While the application programs 54 of the production information managing device 10 have been explained, the application programs for the quality information managing device 20 will be described.

Figure 15:
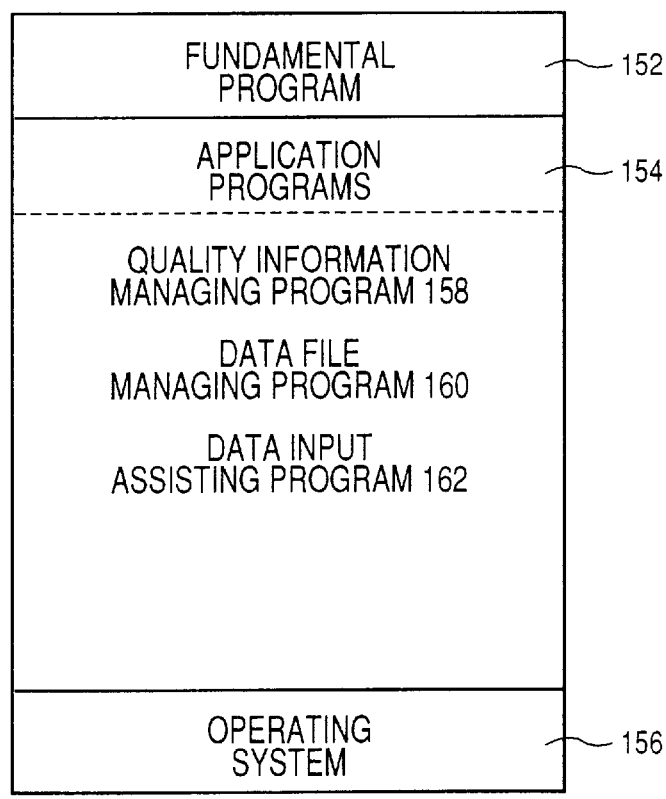
FIG. 15 is a view schematically showing a software arrangement of the quality information managing device of the system of FIG. 1.

Referring to FIG. 15, there is illustrated a software arrangement of the quality information managing device 20. Like the software of the production information managing device 10, the software of the quality information managing device 20 includes a fundamental program 152, application programs 154 and an operating system (OS) 156.

The application programs 154 includes a quality information managing program 158, a data file managing program 160, and a data input assisting program 162. These programs 158, 160, 162 are described in an object-oriented programming language.

The quality information managing program 158 is executed by the computer 30 in response to a command entered by the user. The quality information managing program 158 is an object-oriented program formulated to generate the quality control information (including the quality evaluating standards), for each of the working processes.

The quality control information represents the requirements to assure the desired quality of the products and parts. The generated quality information is stored in the quality information memory 37 also according to the program 158.

Figure 16:
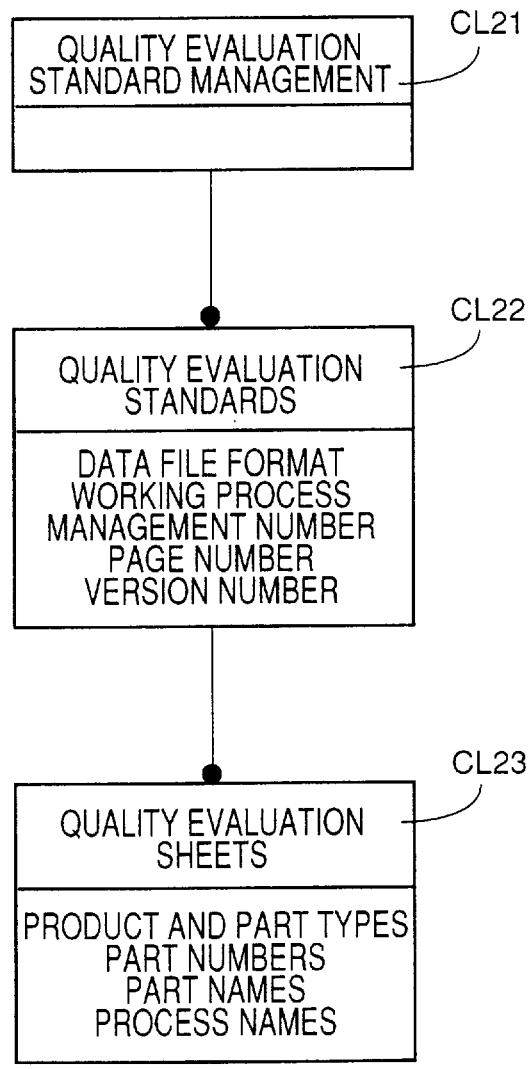
FIG. 16 is a view illustrating an object model adopted by the quality information managing device of FIG. 15 for managing the quality evaluation standards.

The quality information managing program 158 uses an object model as illustrated in FIG. 16. In this object model, a quality evaluation standard management class CL21 has a relationship with a quality evaluation standard class CL22. The quality evaluation standard class CL22 relates to quality evaluation or control standards, and includes, as the attribute, format of data files of the quality evaluation standards, working process, management number, page number and version number. The relationship of the classes CL21 and CL22 is such that one instance of the class CL21 corresponds to all instances of the class CL22, and such that the instance in question of the class CL21 is not deleted even if all the instances of the class CL22 are deleted.

The quality evaluation standard class CL22 has also a relationship with a quality evaluation sheet class CL23. The quality evaluation sheet class CL23 relates to quality evaluation sheets, and includes, as the attribute, types of each product and each part, part numbers, part names, and process names. The relationship between the classes CL22 and CL23 is the same as the relationship between the classes CL21, CL22.

The data file managing program 160 is executed by the computer 30 in response to a command entered by the user. This data file managing program 160 is an object-oriented program formulated to generate data files of the quality information, for each of the working processes, so that the quality information is displayed or printed in the appropriate forms.

Figure 17:
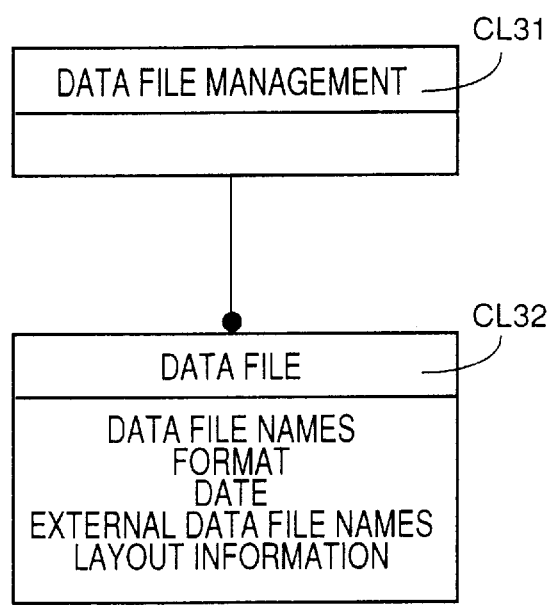
FIG. 17 is a view illustrating an object model adopted by the quality information managing device for managing data files for output forms.

The data file managing program 160 uses an object model as illustrated in FIG. 17. In this object model, a data file management class CL31 has a relationship with a data file class CL32. The data file class CL32 includes, as the attribute, data file names, format of the data file, date, related external data file names, and layout information. The relationship between the classes CL31, CL32 is such that one instance of the class CL31 correspond to all instances of the class CL32, and such that the instance in question of the class CL31 is not deleted even if all the instances of the class CL32 are deleted. The data files for reproducing the forms are considered as examples of the object data (which are examples of the subject data).

The "layout information" represents a relationship between the items of the output form printed or displayed according to the data file and the locations at which the items are placed. With this layout information, therefore, the locations of the items in the output form are determined depending upon the items (e.g., production process class CL2 and working process class CL3). On the other hand, the items of the output form are represented by data sets stored in the production information memory 31, and the locations of the data sets in the production information memory 31 are determined according to object-oriented data base in in the production information managing device 10. When the form is produced according to the data sets (data file), these data sets are retrieved directly from the determined locations of the production information memory 31. Therefore, the present arrangement does not require the data sets to be stored in the quality information memory 37.

The data input assisting program 162 is provided to facilitate data entry upon generation of new data files. Usually, some kinds of data such as terms, graphics and equations to be entered into the computer 30 are commonly used for different data files. In the present embodiment, such kinds of data are registered in a memory and are presented on the display screen as candidate data entries. The user can select desired ones of these candidate data entries by using a mouse, so that the efficiency and reliability of the data input operation are improved.

As an example of the data input assisting program 162, a glossary pallet management program is available. This program is described in an object-oriented programming language, and uses an object model as illustrated in FIG. 18.

Figure 18:
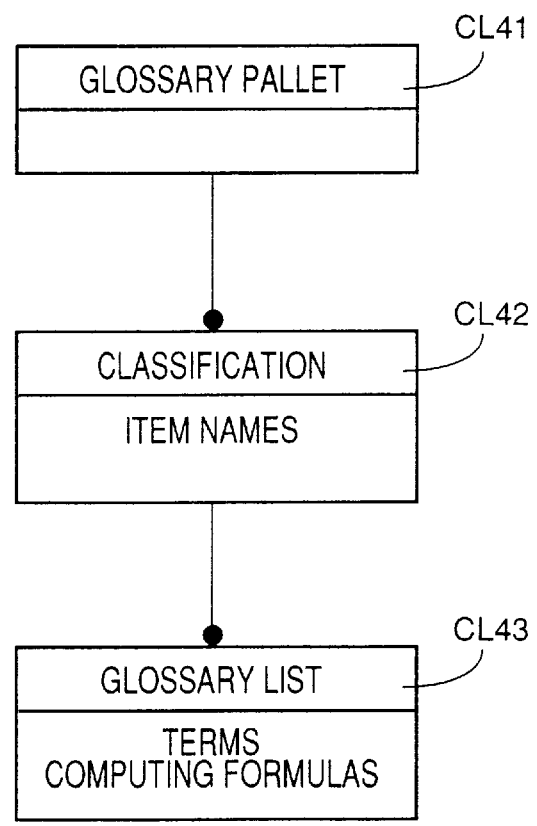
FIG. 18 is a view illustrating an object model adopted by the quality information managing device for managing a glossary pallet.

In the object model of FIG. 18, a glossary pallet class CL41 has a relationship with a classification class CL42. This relationship is such that one instance of the glossary pallet management class CL41 corresponds to all instances of the classification class CL42. The classification class CL42 has items names as the attribute. The classification class CL42 has a relationship with a glossary list class CL43. This relationship is such that one instance of the class CL42 corresponds to all instances of the class CL43. The glossary list class CL43 includes terms and computing equations or formulas as the attributes.

The data input assisting program 162 is not independent of the quality information managing program 158 and the data file managing program 160, but depends on portions of these programs 158, 160, namely, depends on the method portion of each object of the programs 158, 160.

There will next be described the manner in which the quality information is generated according to the object model of FIG. 18 and stored in the quality information memory 37. Reference is made to FIGS. 19–22 showing the display screen in the output device 34 of the quality information managing device 20, and the flow chart of FIGS. 23–27 illustrating an operation performed by the user with respect to the device 20 to generate and store the quality information.

A desired one of the application programs 154 is selected by an appropriate operation by the user after power application to the computer 30 of the quality information managing device 20. As a result, a parent window 60 and a child window 62 are provided on the display screen, as indicated in FIG. 19. The child window 62 is accommodated within the parent window 60. The parent window 60 covers all of the application programs 154, while the child window 62 corresponds to one of the application programs 154 which corresponds to the quality information managing program 158 or the data file managing program 160.

The child window 62 has a title bar 64, a menu bar 66, a tool bar 68, and a data display area 70, as shown in FIG. 19. The title bar 64 is an area in which the names of the application programs 154 and the like are indicated. The menu bar 66 is an area in which a plurality of commands available on the present managing device 20 are indicated. The tool bar 68 is an area in which a plurality of tools available on the present managing device 20 are indicated. The glossary pallet indicated above is one of the tools available.

The operation by the user is initiated with step S10 of FIG. 23 to select a desired one of data file names which have been already registered and which are indicated on the display screen. The data file of the quality information whose name has been selected can be newly created as needed.

The selection of the data file name is effected by operating the mouse to move the cursor to an appropriate data file icon on the display screen, and clicking a pushbutton switch on the mouse.

Figure 20:
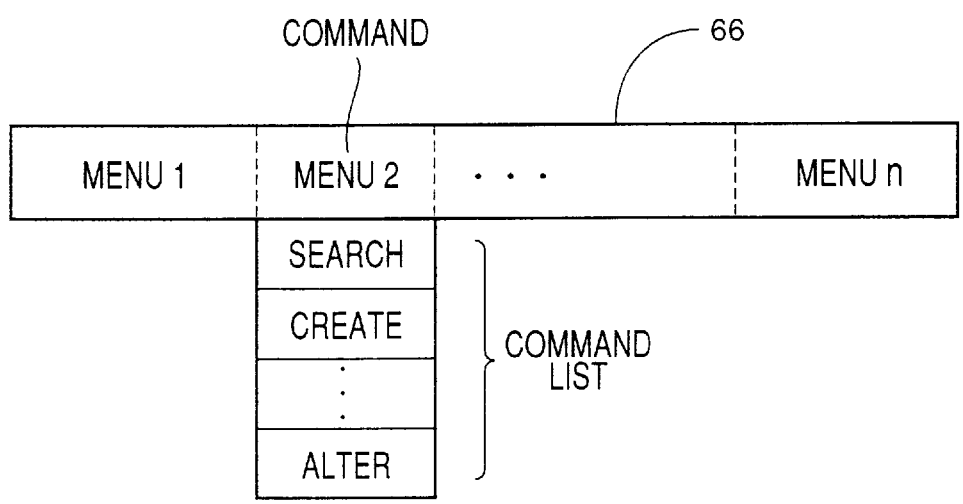
FIG. 20 is a view showing another display content on the display screen.

As a result, the computer 30 of the quality information managing device 30 executes the appropriate application program 154, whereby a grandchild window 72 corresponding to this application program appears in the child window 62, as indicated in FIG. 19. In this grandchild window 72, there is provided a list of commands available for creating the data file, as indicated in FIG. 20.

As indicated in FIG. 23, step S10 is followed by step S12 in which the user selects a command "CREATE" to create the data file. Then, the procedure goes to step S14 to specify a production process, step S16 to select a format in which the data file is reproduced (printed) as an output form, step S18 to specify a working process of the production process, and step S19 to specify a product or a group of products. Appropriate sets of product design information and appropriate sets of product manufacturing information which correspond to the selected production and working processes and product or product group are retrieved from the production information memory 31, so that these sets of information are reproduced in the desired format specified by the user.

In the present quality information managing device 20, the quality information memory 37 stores various terms representative of the respective production processes, data file formats, working processes, products and product groups. A display control program of the operating system OS has a so-called "combo-box function" which permits the above-indicated terms to be displayed on the display screen, so that the user can easily select the appropriate items (production and working processes, data file format, product or product group) by selecting the corresponding terms on the display screen in steps S14, S16, S18, S19.

Step S19 is followed by step S20 in which a command "REGISTER" is selected by selecting the appropriate icon on the screen, after the selections in steps S14, S16, S18 and S19 are confirmed to be accurate.

As a result, the computer 30 operates to retrieve from the production information memory 31 the sets of product design and manufacturing information corresponding to the selected production and working processes and product or product group (sets of production indicated in FIG. 9), and temporarily store the retrieved sets of production information in the quality information memory 37. Then, the computer 30 extracts the temporarily stored sets of production information which are necessary to create the data file in question, and the extracted information is displayed as the data file in the selected format on the display screen.

In the present embodiment, the data representative of the selected production process and working processes and the data erpresentative of the product or product group cooperate to constitute memory location data representative of the locations of the production information memory 31 from which the information is retrieved for creating and display the desired data file. Further, the layout information of the data file managing program 160 is used as layout data which represents a layout of the individual items of the data file (output form) as reproduced in the selected format.

The procedure then goes to steps S22–S34 of FIG. 24, to fill the identifier portion of the data file or form displayed on the screen.

In step S22, the user operates the mouse to move the cursor to the identifier portion of the form displayed on the screen, and double-click the pushbutton of the mouse. As a result, the computer 30 permits the identifier portion of the data file to be created. Thus, the double clicking of the mouse permits any desired portion of the data file to be created. Then, the computer 30 operates to provide the tool bar 68 on the display screen. The user selects a command "GLOSSARY PALLET" on the tool bar 68, and a list of items names (FIG. 18) available for the identifier portion is provided on the display screen.

Step S24 is followed by step S26 to select the desired one of the terms in the glossary pallet, for each of the items described in the identifier portion of the data file.

Described more specifically, the function of the glossary pallet permits a plurality of items to be initially displayed, so that the user then selects one of the items, to display terms and computing formulas which correspond to the selected item, as indicated in FIG. 18. If the displayed terms include the desired term (namely, if an affirmative decision is obtained in step S28), the desired term is selected for entry. If the displayed terms do not include the desired term, namely, if a negative decision (NO) is obtained in step S28, the procedure goes to step S30 in which the user keys in the appropriate term through the keyboard, or select an appropriate one of the displayed terms and alter or edit this term as needed.

After the desired one of the displayed terms is selected with the affirmative decision (YES) obtained in step S28 or after the desired term is keyed in in step S30, the procedure goes to step S32 to determine whether any alteration of the entered data is necessary. If any alteration is necessary, the procedure goes back to step S26 and make the necessary alteration. If no alteration is necessary, the procedure goes to step S34 in which the user selects a command "CLOSE" to close the opened glossary pallet, by moving the cursor to the appropriate icon.

The data thus entered are stored in the quality information memory 37, together with the date, as part of the data file to be created.

Then, the procedure goes to steps S36–S52 of FIG. 25, to create the descriptive portion of the data file (output form). In step S36, the user selects the name of the data file name whose descriptive portion is to be created. Then, the computer 30 operates to display a list of commands available. Step S36 is followed by step S38 to select a command "DESCRIPTION" to permit the creation of the descriptive portion. In the next step S40, the user operates the mouse to move the cursor to a desired area of the descriptive portion of the displayed form of the data file, and double-clicks the pushbutton of the mouse. As a result, the desired area of the descriptive portion can be created.

Then, steps S42 through S52 are performed in the same manner as steps S24–S34 of FIG. 24, whereby the descriptive portion of the data file (output form) is created, utilizing the glossary pallet function.

The procedure then goes to step S54 of FIG. 26 through step 84 of FIG. 27, to create the graphic portion of the data file.

In step S54, the user selects the name of the data file name whose graphic portion is to be created. Then, the computer 30 operates to display a list of commands available. Step S54 is followed by step S56 to select a command "GRAPHIC" to permit the creation of the graphic portion.

Then, the procedure goes to step S58 in which the user is prompted to select data input mode, that is, one of "edit mode" and "free mode". In the edit mode, any sets of data in the production information memory 31 and the quality information memory 37 are copied, edited, combined or otherwise utilized to create the graphic portion of the data file. In the free mode, desired data are keyed in through the keyboard, without utilizing any data in the memories 31, 37.

If the free mode is selected in step S60, the procedure goes to step S62 in which the user specifies the desired area of the graphic portion of the data file, by operating the mouse. Step S62 is followed by step S64 to key in the desired graphic data and/or characters. Then, the procedure goes to step S86 of FIG. 27.

If the edit mode is selected in step S66, the procedure goes to step S68 to select a command "DATA FILE LIST", which is one of the commands displayed on the menu bar 66. Then, the user selects a command "SEARCH", whereby a list of data file names registered in the quality information memory 37 is provided on the display screen.

The procedure then goes to step S72 to select the name of the data file whose graphic portion is utilized to create the data file in question. Further, the user selects a command "DISPLAY" by moving the cursor to the appropriate icon. As a result, the computer 30 operates to retrieve the selected data file from the memory 37 and display the retrieved data file on the display screen. Step S72 is followed by step S74 in which the user selects desired graphic data in the graphic portion of the displayed data file, and select the command "REGISTER". Step S74 is followed by step S76 (FIG. 27) in which the selected graphic data is copied at the desired position in the graphic portion of the data file in question. Then, step S78 is implemented to edit or process (e.g., enlarge or reduce) the copied graphic data.

The procedure then goes to step S80 in which the user is prompted to determine whether the copied graphic data are preserved or not. If the user wishes to preserve the copied graphic data, a command "PRESERVE" is selected in step S82 by moving the cursor to the appropriate icon. Then, the computer 30 operates to initialize the display screen in step S84. The initial state of the screen is shown in FIG. 19.

If the user does not wish to preserve the copied graphic data, the user is prompted to determine in step S86 whether the operation to create the data file in question is terminated or not. If the user wishes to terminate the operation, a command "TERMINATE" is selected in step S88 by moving the cursor to the appropriate icon. In this case the display screen is initialized in step S84. If the user wishes to utilize other graphic data stored in the memory 37, the user selects neither the command "PRESERVE" nor the command "TERMINATE". In this case, the procedure goes back to step S54, and the operation is continued to create the graphic portion of the data file in question.

When it is desired to print a form according to the thus created data file for the selected working process of the selected production process, the user specifies the name of the data file and select an appropriate command for commanding the computer 30 to activate the output device 34 to print the form according to the data file. The printed form includes the product design information, product manufacturing information and quality control information associated with the working process in question.

Figure 21:
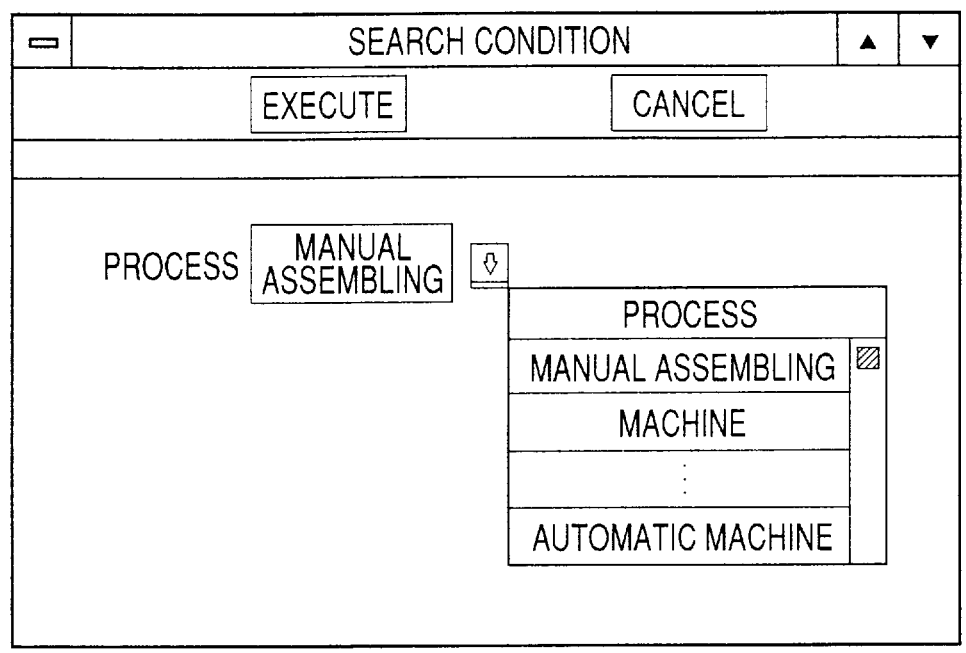
FIG. 21 is a view showing a further display content on the display screen.

In the illustrated embodiment, the command "CREATE" on the menu bar 66 in the child window 62 is selected to create the new data file. However, a desired one of the already existing data files may be edited. In this case, a command "SEARCH" is selected. In this case, the condition in which the search is effected is specified on the display screen as indicated in FIG. 21. The search condition is entered through the keyboard, or by utilizing the so-called "combo-box" function which provide candidates of the search condition, so that the user selects the desired search condition from the displayed candidates. A result of the search effected by the quality information managing device 20 is displayed on the display screen as indicated in FIG. 22.

It will be understood from the present embodiment of this invention that the product information system is capable of reproducing a form according to a data file for a desired working process of a desired production process. The reproduced form includes the product design information, product manufacturing information and quality control information associated with the selected working process, so that the user may easily utilize the reproduced form for various purposes, for improving the production efficiency and/or quality of the product.

The data files are created or edited according to the object-oriented concept, utilizing the product design information and the product manufacturing information stored in the production information memory 31 and the quality control information stored in the quality information memory 37, in a coordinated fashion for total management of the information, which permits automatic alteration of the contents of the data files upon creation or editing of the production information stored in the production information memory 31. Accordingly, the present product information managing system assures improved accuracy of creation and management of the desired data files and reduced work load on the user for the product information management.

Further, the data input assisting program 162 permits high efficiency of data communication of the user with the computer 30 in a conversational fashion in creating or editing the data files.

The present embodiment is adapted such that the data files include graphic data which permit the user to accurately and easily understand the product information.

Although the graphic data in the data files may be detailed design drawings exactly showing the entire construction of each part associated with the selected working process, the graphic data may preferably include simplified drawings which show important configurational characteristics of the part and which permit the user to recognize the part. This arrangement results in reducing the required amount of the graphic data and accordingly reducing the required storage capacity of the memory.

Referring back to FIG. 1, the network 40 includes a part list information managing device 200, as well as the production information managing device 10 and the quality information managing device 20. This part list information managing device 200 has a software arrangement similar to those in the devices 10, 20, and has a product design information memory 202 for storing product design information which represents relationships between each product and the parts constituting the product. The device 200 is also adapted to generate the product design information under a suitable object model. The production information managing device 10 receives through the network 40 the product design information from the part list information managing device 200, as needed. The received product design information received by the device 10 is stored in the production information memory 31. The object models employed by the devices 10 and 200 are substantially similar to each other, so that the product design information generated by the device 10 and that generated by the device 200 can be compared with each other for automatic verification to find any errors, whereby the accuracy of management of the product information is improved. However, the present arrangement may be modified such that the production information managing device 10 is adapted to store only the product manufacturing information according to the object-oriented concept, while the quality information managing device 20 is adapted to receive the part list information directly from the part list information managing device 200, not via the production information managing device 10.

The product design information memory 202 cooperates with the memories 31 and 37 to constitute the product information memory, which stores the product design information, product manufacturing information and quality control information.

The object models used in the present product information managing system may include a dictionary class which has different languages such as Japanese, English, German and French, which permit translations of the terms used in the data processing. In this case, the product information system has improved flexibility in managing the product information even where the motor vehicles are manufactured in different countries of different languages.

It will be understood from the foregoing description of the present embodiment that the input device 32 and the portions of the computers 30 of the devices 10, 20 assigned to execute the production information generating and storing program 58, quality information managing program 158 and data input assisting program 162 cooperate to constitute a data storing device for storing a plurality of sets of production information and quality control information in relation to each other. It will also be understood that the output device 34 and the quality information memory 37 of of the device 20 and the portions of the computer 30 of the device 20 assigned to execute the data file managing program 160 and the data input assisting program 162 cooperate to constitute a data output device for outputting the data files including the production information and quality control information. It will also understood that the quality information memory 37 functions as an output information memory for storing the layout data and the memory location data, while the portion of the computer 30 of the device 20 assigned to execute the data file managing program 160 functions as storing means for storing the layout data and the memory location data and also functions as reproducing means for reading out the layout data and the memory location data from the display information memory, to retrieve the information (data file) from the product information memory 31, 37, 202 on the basis of the memory location data, and for reproducing the information in the predetermined format according to the layout data.

Referring to FIGS. 28–34, other embodiments of the present invention will be described. These embodiments are identical with the first embodiment of FIGS. 1–27, except for the quality information managing device 20, which will be described in detail.

Figure 28:
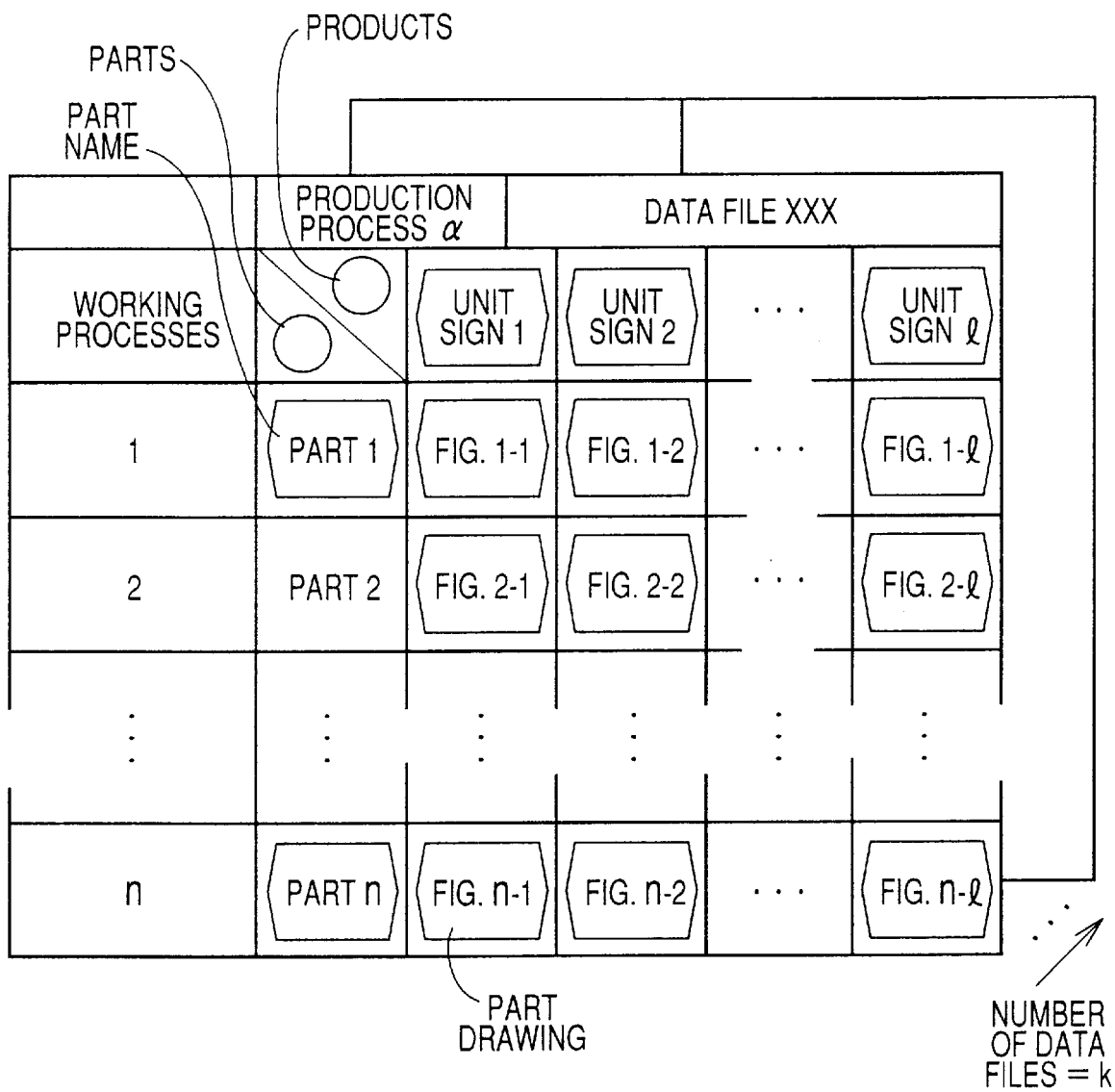
FIG. 28 is a view showing a data file for an output form of product design information, according to another embodiment of this invention.

In the first embodiment, the quality information for each of the working processes of each production process is included in one data file for reproducing a form (for producing a printed or displayed form) as indicated in FIG. 4. However, each data file (output or reproduced form) may correspond to working processes of one production process which covers a plurality of combinations of products and parts, as indicated in FIG. 28. More specifically explained, each data file has a coordinate system in which the products are taken along a horizontal axis while the parts are taken along a vertical axis. The products are specified in the desired order by the user by respective identification codes or unit signs. The data file represents relationships between each product and parts which constitute the product. The parts of each product are arranged in an order that permits easy understanding of the construction of the product. Thus, the data file includes the product design information indicative of the constructional relationship between each product and its component parts. The working processes correspond to the respective parts of each product. The data file has a matrix of part drawings which are located at respective coordinate positions corresponding to the respective combinations of the products and parts. The part drawings need not be design drawings, but may be simplified drawings showing configurational features of the parts, which features are effective to permit the user to distinguish the parts from each other.

Figure 29:
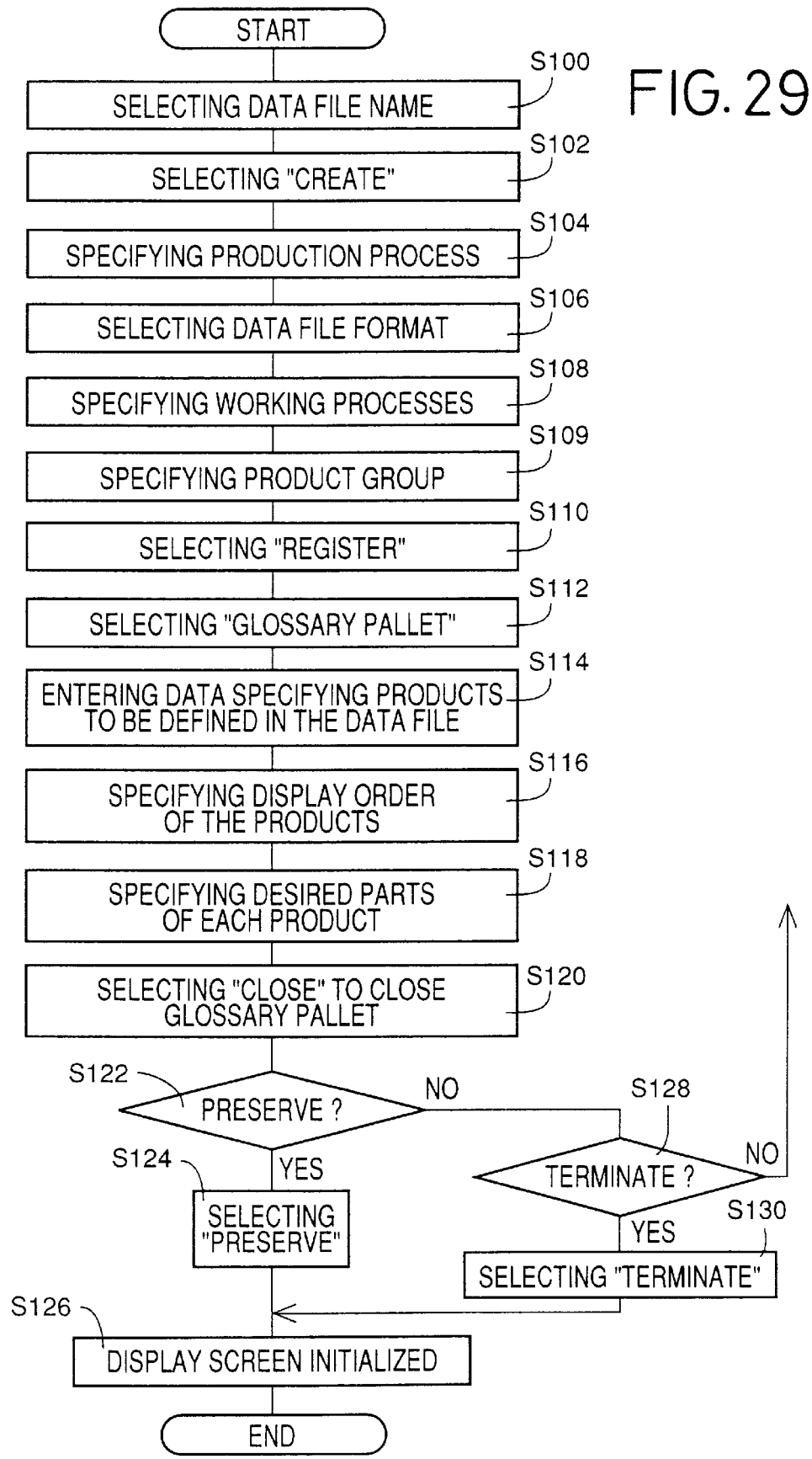
FIG. 29 is a flow chart illustrating an operation of a computer by the user of the quality information managing device, to generate the data file of FIG. 28.

Reference is now made to the flow chart of FIG. 29 showing a procedure to generate the data file of the type described above. This procedure includes steps similar to those in the procedure of FIGS. 23–27 of the first embodiment, and these steps will be only briefly described.

The procedure first goes to steps S100–S112 similar to steps S10–S20 of FIG. 23. In step S100, the user selects the name of the data file which is to be created. Then, in step S102, the user selects the command "CREATE" to create the data file in question. Step S102 is followed by step S104 to select the desired production process for which the data file is to be created. Then, the procedure goes to step S106 to select the data file format, and to step S106 to specify the data file format. Step S106 is followed by step S108 to specify the working processes, and step S108 to select the command "REGISTER".

Then, the procedure goes to step S112 to select the command "GLOSSARY PALLET" on the tool bar on the display screen. Step S112 is followed by steps S114–S118 to enter data specifying the products and parts for which the data file is to be created. Namely, unit signs or identification codes representative of the desired products are entered in step S114 using the glossary pallet function. Step S114 is followed by step S116 to specify the order in which the products appear on the display screen or output form. Then, step S118 is implemented to specify the desired one or ones of the parts of each product, which is/are included in the data file in question. Namely, the data file may cover only the selected one or ones of the parts which constitute the product, where the user is interested in only some of the parts of the product.

Thus, the products and parts are defined as the data file including the product design information. Then, the procedure goes to step S120 to select the command "CLOSE" to close the glossary pallet.

The procedure then goes to step S122 in which the user is prompted to determine whether the thus created data file is preserved or not. If the user wishes to preserve the copied graphic data, a command "PRESERVE" is selected in step S124 by moving the cursor to the appropriate icon. Then, the computer 30 operates to initialize the display screen in step S126. If the user does not wish to preserve the created data file, the user is prompted in step S128 to determine whether the operation to create the data file in question is terminated or not. If the user wishes to terminate the operation, the command "TERMINATE" is selected in step S130 by moving the cursor to the appropriate icon. In this case the display screen is initialized in step S26. If the user wishes to continue the operation to create another data file, the user selects neither the command "PRESERVE" nor the command "TERMINATE". In this case, the procedure goes back to step S100.

In the present second embodiment of this invention, the data file when reproduced graphically represents the relationship between each desired product and its component parts, permitting the user to easily recognize the constructional relationship of each component to the product.

Since only the selected parts of the product in question are included in the data file and in the reproduced form, in the order in which the parts are processed in the working processes, the user can easily understand the content of the data file.

The two different types of data files or output forms have been described by reference to FIGS. 4 and 28, the content included in each data file and the format of the data files may be suitably modified. Some of these modifications of the data files will be briefly described.

Figure 30:
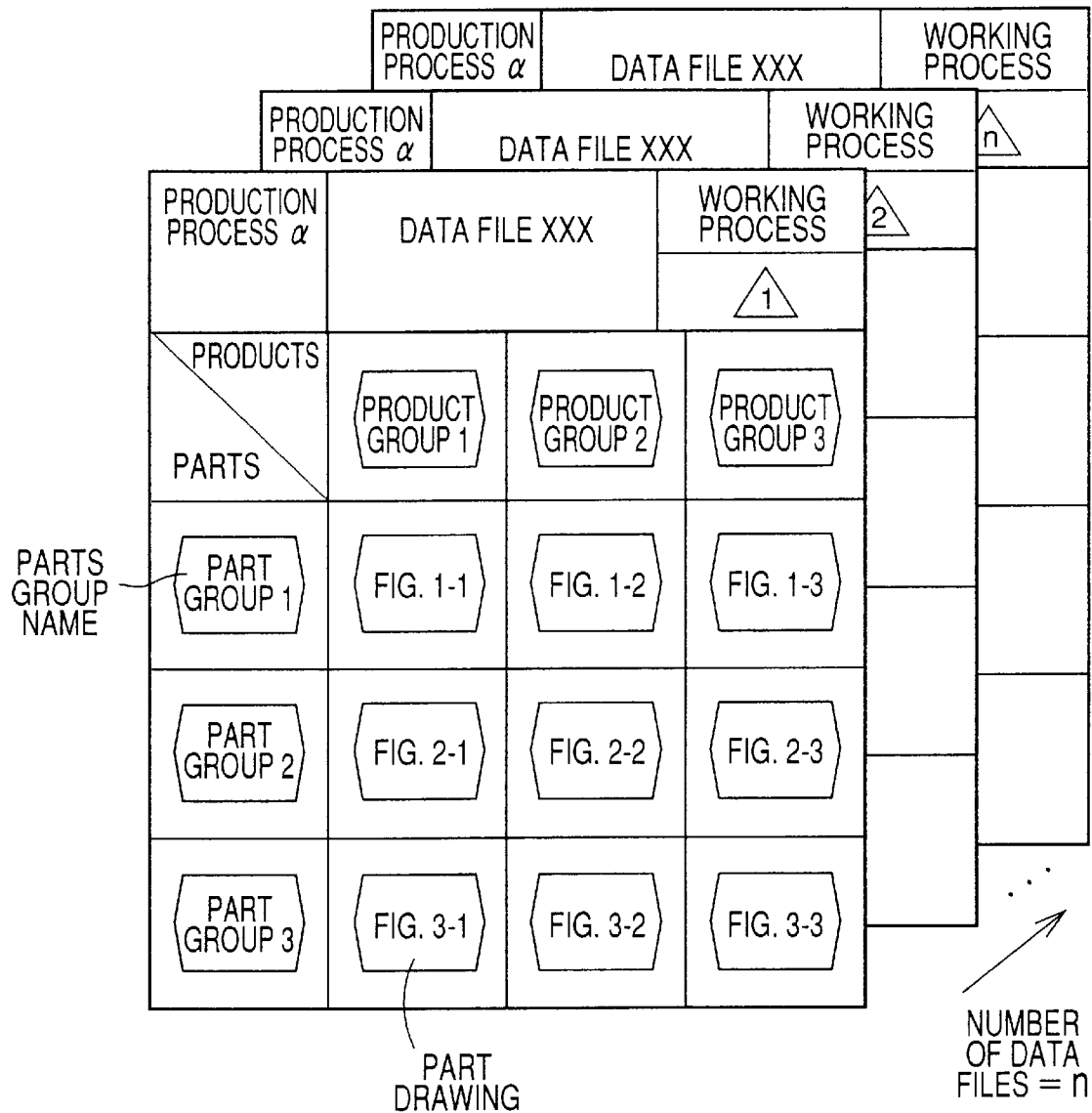
FIG. 30 is a view showing a data file for an output form of product design information, according to a further embodiment of the invention.

A data file illustrated in FIG. 30 is formulated to combine the features of the data files of FIGS. 4 and 28. That is, each data file corresponds to each working process, and has a coordinate system in which product groups and part groups are taken along the horizontal and vertical axes, respectively. Unlike the data file of FIG. 28, the data file of FIG. 30 deals with the groups of products and groups of parts, rather than the individual products and parts as in the embodiment of FIG. 28.

Referring to the flow chart of FIG. 31, there will be described a procedure to generate the data file of the type described above by reference to FIG. 30. While the procedure of FIG. 31 is partly identical with that of FIG. 29, only the steps of FIG. 31 different from those of FIG. 29 will be described.

The procedure first goes to steps S200–S212 similar to steps S100–S112 of FIG. 29. Step S212 is followed by steps S214–S218 to enter data specifying the product groups for which the data file is to be created. Namely, unit signs or identification codes representative of the desired product groups are entered in step S214 using the glossary pallet function. Step S214 is followed by step S216 to specify the order in which the product groups appear on the display screen or output form. Then, step S218 is implemented to enter the identification codes to specify the desired parts of each part group, which parts included in the data file in question. Thus, the product groups and part groups are defined as the data file including the product design information. Then, the procedure goes to steps S220–S230 similar to steps S120–S130 of FIG. 29.

The product groups and part groups to be included in one data file may be selected from the standpoint of the worker engaged in the manufacture of the products, rather than the designers of the products. A product group may consist of products which have different shapes but include the same part or parts. A part group may consist of parts which do not have completely the same specifications but have basically similar configurations and may be subjected to substantially similar working processes.

Figure 31:
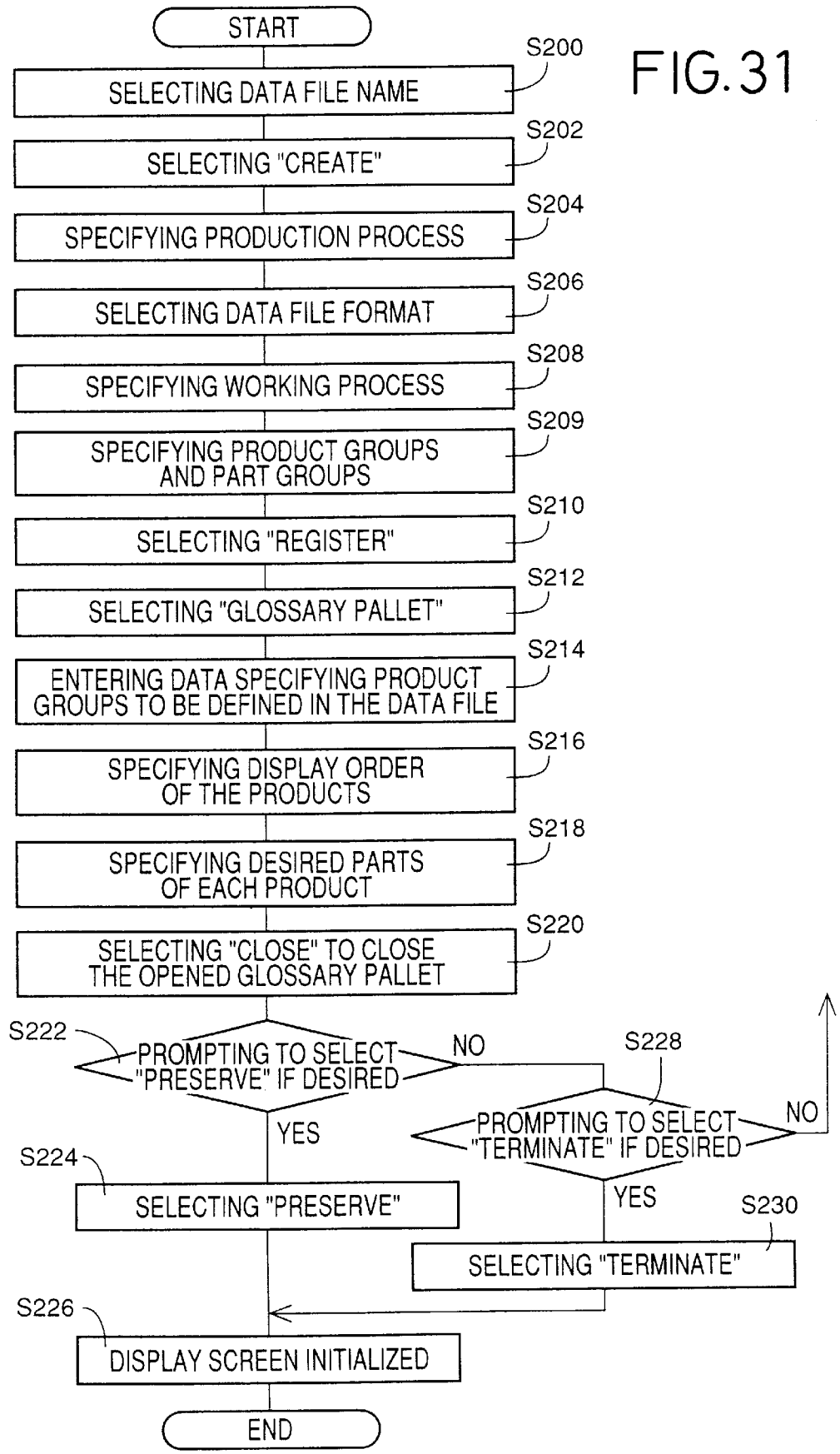
FIG. 31 is a flow chart illustrating an operation of a computer by the user of the quality information managing device, to generate the data file of FIG. 30.

Therefore, the forms reproduced according to the data files in the third embodiment of FIGS. 30 and 31 are effective to prevent the workers from using wrong products or parts in assembling a motor vehicle, for example.

Figure 32:
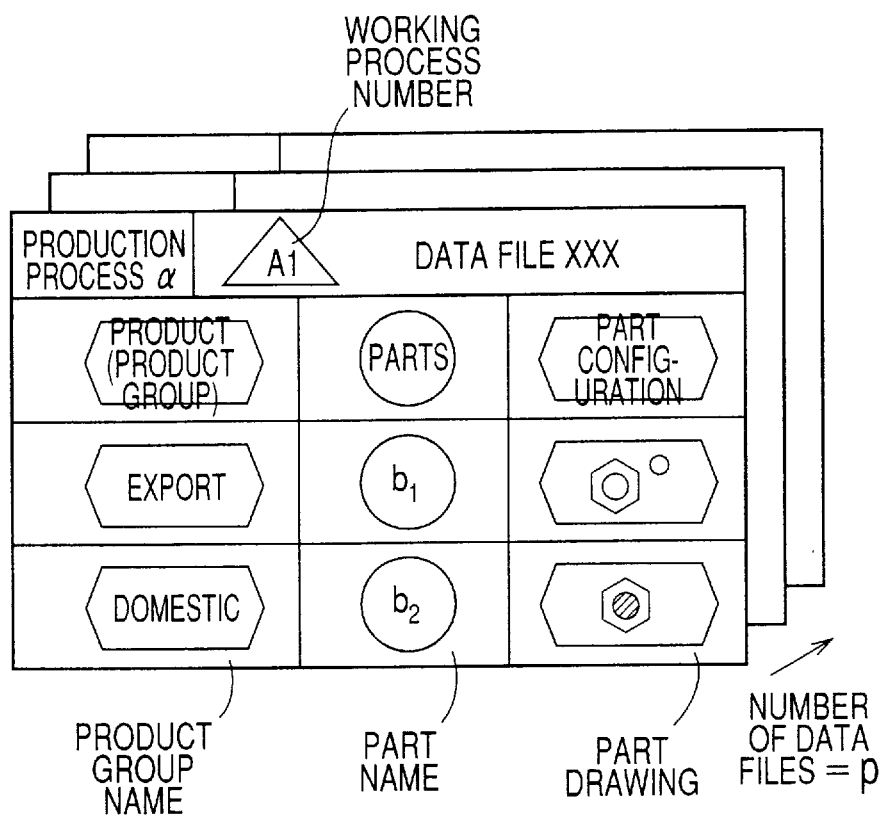
FIG. 32 is a view showing a data file for an output form of product design information, according to a still further embodiment of the invention.

Another modification of the data files is illustrated in FIG. 32. In this case, each data file corresponds to each working process, and includes simple part drawings showing the configurations of the parts of each product (each product group), as well as the names of the parts. In this embodiment, the data file including a given product is reproduced when one of the parts of that product is specified by the user. If the specified part is used in two or more products, these products are all listed in the data file as a product group.

Figure 33:
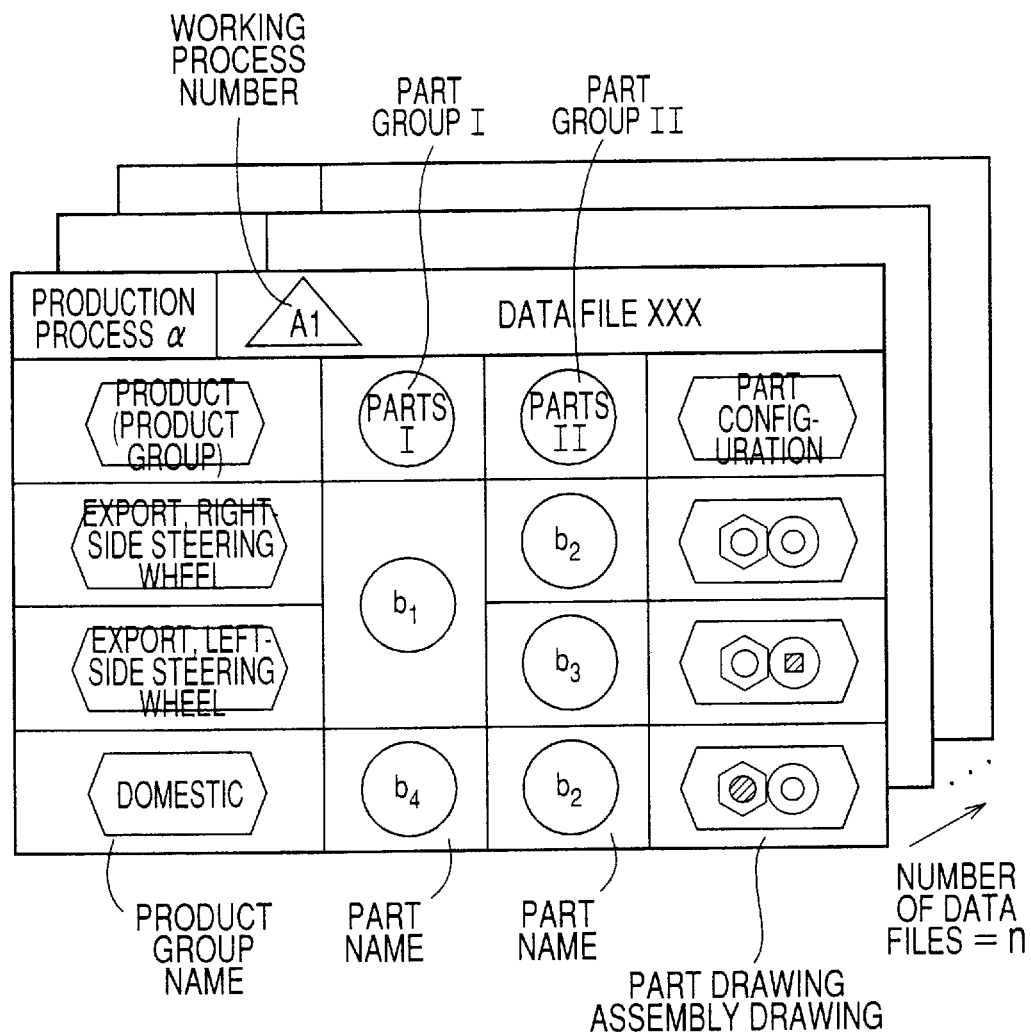
FIG. 33 is a view showing a data file for an output form of product design information, according to a yet further embodiment of the invention.

A further modification of the data files is illustrated in FIG. 33. These data files are basically similar to those of FIG. 32. However, each data file may include two or more combinations of child or element parts (b1–b4) which are selectively used to constitute parent or combination parts (b1+b2, b1+b3, b2+b4). Thus, data file includes the drawings of the child parts in combination for each parent part.

A yet further modification of the data files is illustrated in FIG. 34. In this case, each data file corresponds to each product, and includes the names and simple drawings of the parts of the product. The parts are arranged in the order in which the parts are subjected to working processes.

While the novel techniques for generating and reproducing data files including the production information (product design information and product manufacturing information) and quality control information have been described above, these techniques are not limited to the generation or editing of the data files according to the object-oriented concept, but are applicable to the generation or editing of the data files which are not based on the object-oriented concept.

The illustrated embodiments are adapted to manage both sets of construction-related information in the form of the product design information, and sets of production-related information in the form of the product manufacturing information and quality control information. These sets of construction-related information and production-related information are considered to be subjects which can be similar processed. The relationships between the subjects are extracted, and subject substance data indicative of the substance of each subject and relationship substance data indicative of the substance of the relationships are generated according to various programs and data base which are formulated based on the object-oriented concept, so that a set of subject data incorporating the subject substance data and the relationship substance data is stored in the product information memory, for each subject, such that the subject substance data and the relationship substance data are related to each other. The object-oriented concept is suitably used to effectively manage the construction-related information and the production-related information. However, the application of the object-oriented concept is not essential to practice the principle of the present invention, and the programs and data base may be based on the conventional techniques.

While the present invention has been described above in detail in its presently preferred embodiments by reference to the accompanying drawings, it is to be understood that the invention is not limited to the details of the illustrated embodiments, but may be embodied with various changes, modifications and improvements, which may occur to those skilled in the art, without departing from the scope of the invention defined in the following claims:

What is claimed is:

1. A method of totally managing a plurality of sets of construction-related information and a plurality of sets of production-related information, each of said plurality of sets of construction-related information relating a constructional relationship between a corresponding one of a plurality of products to be produced and a plurality of parts which constitute said each product, while said plurality of sets of production-related information relating production of said products, respectively, said method comprising the steps of:

determining each of said plurality of sets of construction-related information and said plurality of sets of production-related information as a corresponding one of a plurality of subjects which can be similarly processed;

extracting at least one relationship of each of said plurality of subjects with the other of said subjects;

classifying said plurality of subjects into a plurality of classes on the basis of the extracted at least one relationship of said each subject;

generating subject substance data indicative of a substance of said each subject and relationship substance data indicative of a substance of said at least one relationship of said each subject;

storing, for said each subject, a set of subject data incorporating a plurality of sets of element data in relation to each other, in a product information memory, said plurality of element data including said subject substance data and said relationship substance data of said each subject; and retrieving said set of subject data for at least one of said plurality of subjects from said product information memory, and outputting the retrieved set of subject data.

2. A method according to claim 1, wherein said plurality of classes comprises:

a production process class including at least one of said plurality of subjects which comprises at least one of said plurality of sets of production-related information which relates to identification of a plurality of production processes for producing each of said products and said plurality of parts;

a working process class including at least one of said plurality of subjects which comprises at least one of said plurality of sets of production-related information which relates to identification of a plurality of working processes to be performed for production of said each product and said plurality of parts in at least one of said production processes;

a product class including at least one of said plurality of subjects which comprises at least one of said plurality of sets of construction-related information which relates to identification of said each product; and a part class including at least one of said plurality of subjects which comprises at least one of said plurality of sets of construction-related information which relates to identification of said plurality of parts of said each product.

3. A method according to claim 2, wherein said production process class and said working process class has a relationship, as one of said at least one relationship, that one of said plurality of production processes is an aggregation of said plurality of working processes, said plurality of production processes corresponding to the substance of at least one of said plurality of subjects which belongs to said production process class, while said plurality of working processes corresponding to the substance of at least one of said plurality of subjects which belongs to said working process class.

4. A method according to claim 2, wherein said product class and said part class have a relationship, as one of said at least one relationship, that each of at least one of said plurality of products is an aggregation of at least one of said plurality of parts, said at least one of said plurality of products corresponding to the substance of at least one of said plurality of subjects which belongs to said product class, while said at least one of said plurality of parts corresponding to the substance of at least one of said plurality of subjects which belongs to said part class.

5. A method according to claim 1, wherein said plurality of sets of construction-related information and said plurality of sets of production-related information comprise a plurality of sets of product information which are different in kind and which are used for producing at least one vehicle as one of said plurality of products by producing and/or purchasing said plurality of parts and assembling said plurality of parts.

6. A method of totally managing a plurality of sets of construction-related information and a plurality of sets of production-related information, each of said plurality of sets of construction-related information relating a constructional relationship between a corresponding one of a plurality of products to be produced and a plurality of parts which constitutes said each product, while said plurality of sets of production-related information relating production of said products, respectively, said method comprising the steps of:

- determining each of said plurality of sets of construction-related information and said plurality of sets of production-related information as a corresponding one of a plurality of objects, each of said objects being constituted according to an object-oriented concept by substantially encapsulating an attribute and a method;
- describing a substance of said each object by a cooperative combination of a set of data and a procedure to be applied to said set of data;
- defining said set of data and said procedure of of said each object as said attribute and said method of said each object, respectively;
- extracting at least one relationship of each of said plurality of objects with the other of said objects;
- classifying said plurality of objects into a plurality of classes on the basis of the extracted at least one relationship of said each object;
- defining a substance of said each object and a substance of said at least one relationship of said each object as said attribute, and defining an action of said object as said method of said each object;
- generating a plurality of sets of object data including first data indicative of the substantially encapsulated attribute and method of said each object, and second data indicative of said extracted at least one relationship of said each object, said first data and said second data being related to each other;
- storing said plurality of sets of object data for said each object in a product information memory; and
- retrieving at least one of said plurality of sets of object data from said product information memory, and outputting each of the retrieved at least one set of object data.

7. A system for totally managing a plurality of sets of construction-related information and a plurality of sets of production-related information, each of said plurality of sets of construction-related information relating a constructional relationship between a corresponding one of a plurality of products to be produced and a plurality of parts which constitutes said each product, while said plurality of sets of production-related information relating production of said products, respectively, said system comprising:

- a product information memory for storing said plurality of sets of construction-related information and said plurality of sets of production-related information as a plurality of subjects which can be processed similarly and which are classified into a plurality of classes on the basis of extracted at least one relationship of each of said plurality of subjects with the other of said subjects;
- a data storing device operable to store a set of subject data incorporating a plurality of sets of element data for each of said plurality of subjects in relation to each other, in said product information memory, in response to a first data storing operation by a user of the system, said plurality of sets of element data for said each subject including at least one set of subject substance data indicative of a substance of said each subject and at least one set of relationship substance data indicative of a substance of each of said extracted at least one relationship of said each subject; and
- a subject data output device for retrieving at least one of said plurality of subject data from said product information memory and outputting each of the retrieved at least one set of subject data, in response to an operation by said user.

8. A system according to claim 7, wherein said subject data output device comprises:

- an output medium for reproducing said at least one of said plurality of subject data;
- an output information memory for storing layout data and memory location data, said layout data representing a layout of said plurality of sets of element data for said each subject to be reproduced at respective positions on said output medium, said memory location data being representing locations of said plurality of sets of element data in said product information memory;
- storing means operable for storing said layout data and said memory location data in said output information memory, in response to a second data storing operation by said user; and
- reproducing means for reading out said layout data and said memory location data from said output information memory, to retrieve said at least one of said plurality of subject data from said product information memory, on the basis of the read-out memory location data, and for reproducing said at least one set of subject data on said output medium according to said layout represented by the read-out layout data.

9. A system according to claim 7, wherein said product information memory, said subject data storing device and said subject data output device are constituted by a production information managing device and a quality information managing device, said production information managing device being operable for managing a plurality of sets of product design information as said plurality of sets of construction-related information, and a plurality of sets of product manufacturing information as at least one of said plurality of sets of production-related information, said sets of product design information representing the construction of said plurality of products and said plurality of parts of each of said products, said sets of product manufacturing information being used to produce said products and said parts, said quality information managing device being operable for managing a plurality of sets of quality control information as at least one of said plurality of production-related information, said plurality of sets of quality control information being used to check a quality of each of said plurality of products, said system further comprising a signal transmission circuit interconnecting said production information managing device and said quality information managing device for interactive communication therebetween.

10. A system according to claim 9, wherein said quality information managing device comprises:

a quality information memory for storing said plurality of sets of quality control information;

data generating means, operable in response to an operation by said user, for receiving from said production information managing device through said signal transmission circuit at least one of said plurality of sets of product design information and at least one of said plurality of sets of product manufacturing information, and for generating at least one of said plurality of sets of quality control information on the basis of the information received from said production information managing device; and data storing means, operable in response to a third data storing operation by said user, for storing in said quality information memory said quality control information generated by said data generating means.

* * * * *